US005934636A

United States Patent [19]
Cyrell

[11] Patent Number: 5,934,636
[45] Date of Patent: Aug. 10, 1999

[54] CONTINUOUSLY ADJUSTABLE SURFACE MOUNTING SYSTEM

[75] Inventor: Alexander Cyrell, Paradise Valley, Ariz.

[73] Assignee: Omnimount Systems, Inc., Phoenix, Ariz.

[21] Appl. No.: 09/055,602

[22] Filed: Apr. 6, 1998

[51] Int. Cl.⁶ .................................................. A47G 29/02
[52] U.S. Cl. ...................................... 248/246; 248/220.21
[58] Field of Search ................................... 248/317, 243, 248/244, 245, 246, 220.21

[56] References Cited

U.S. PATENT DOCUMENTS

| | | | |
|---|---|---|---|
| 2,204,493 | 6/1940 | Henry | 211/105.3 |
| 2,831,808 | 4/1958 | Esseff et al. | 204/297 W |
| 2,976,003 | 3/1961 | Foster | 248/243 |
| 3,313,509 | 4/1967 | Lockert | 248/244 |
| 3,429,602 | 2/1969 | Dirilgen | 403/295 |
| 3,451,153 | 6/1969 | Dohanyos | 40/741 |
| 3,476,344 | 11/1969 | Pace | 248/243 |
| 3,502,293 | 3/1970 | Bard | 248/243 |
| 3,784,043 | 1/1974 | Presnick | 220/4.28 |
| 4,031,796 | 6/1977 | Wilkes | 84/20 |
| 4,074,811 | 2/1978 | Filak | 211/191 |
| 4,356,618 | 11/1982 | Beaulieu | 40/783 |
| 4,450,655 | 5/1984 | Rosenthal et al. | 248/222.13 |
| 4,831,804 | 5/1989 | Sayer | 52/475.1 |
| 4,924,649 | 5/1990 | Taylor | 52/656.9 |
| 4,997,155 | 3/1991 | Reuter et al. | 248/278.1 |
| 5,165,644 | 11/1992 | Allen | 248/285.1 |
| 5,535,974 | 7/1996 | Savitski | 248/246 |
| 5,538,214 | 7/1996 | Sinila | 248/278.1 |

FOREIGN PATENT DOCUMENTS 2231995  11/1990  United Kingdom .

OTHER PUBLICATIONS

Publication entitled "Arc Connections I, Adjustable Framing Support Systems From Omnimount"; Copyright 1996 Omnimount Systems, Inc.

*Primary Examiner*—Ramon O. Ramirez
*Assistant Examiner*—Robert Lipcsik
*Attorney, Agent, or Firm*—Ladas & Parry

[57] ABSTRACT

A continuously adjustable surface mounting system for supporting objects in a range of positions with respect to a mounted surface. The system includes a surface mounted assembly and one or more support assemblies releasably secured at any point along a length of the surface mounted assembly. J-shaped bends formed in member(s) of the support assembly fit within T-shaped channels in the surface mounted assembly and react to cantilever force exerted upon the surface mounted assembly by binding within the T-shaped channels, thereby locking in place on the surface mounted assembly. Clips may be secured to the support assembly and tightened to prevent release of the support assembly from a force opposing the cantilevered force. A cantilevered member extending from the support assembly preferably supports a shelf on which objects may be placed. To adjust sag of the cantilevered member, tilt adjustment screws may be used to tilt the cantilevered member with respect to the remainder of the support assembly. Flexible wire management shrouds may flank and be attached to the surface mounted assembly for running and hiding wires, cords, etc. along the length of the surface mounted assembly. The flexible wire management shrouds provide easy opening and access to wires, cords, etc. within the wire management shrouds. Vibration isolation elements may be installed between the shelf and the remainder of the support assembly to isolate each shelf from receiving and transmitting vibration. A lighting system is preferably installed in several locations on the surface mounting system.

51 Claims, 13 Drawing Sheets

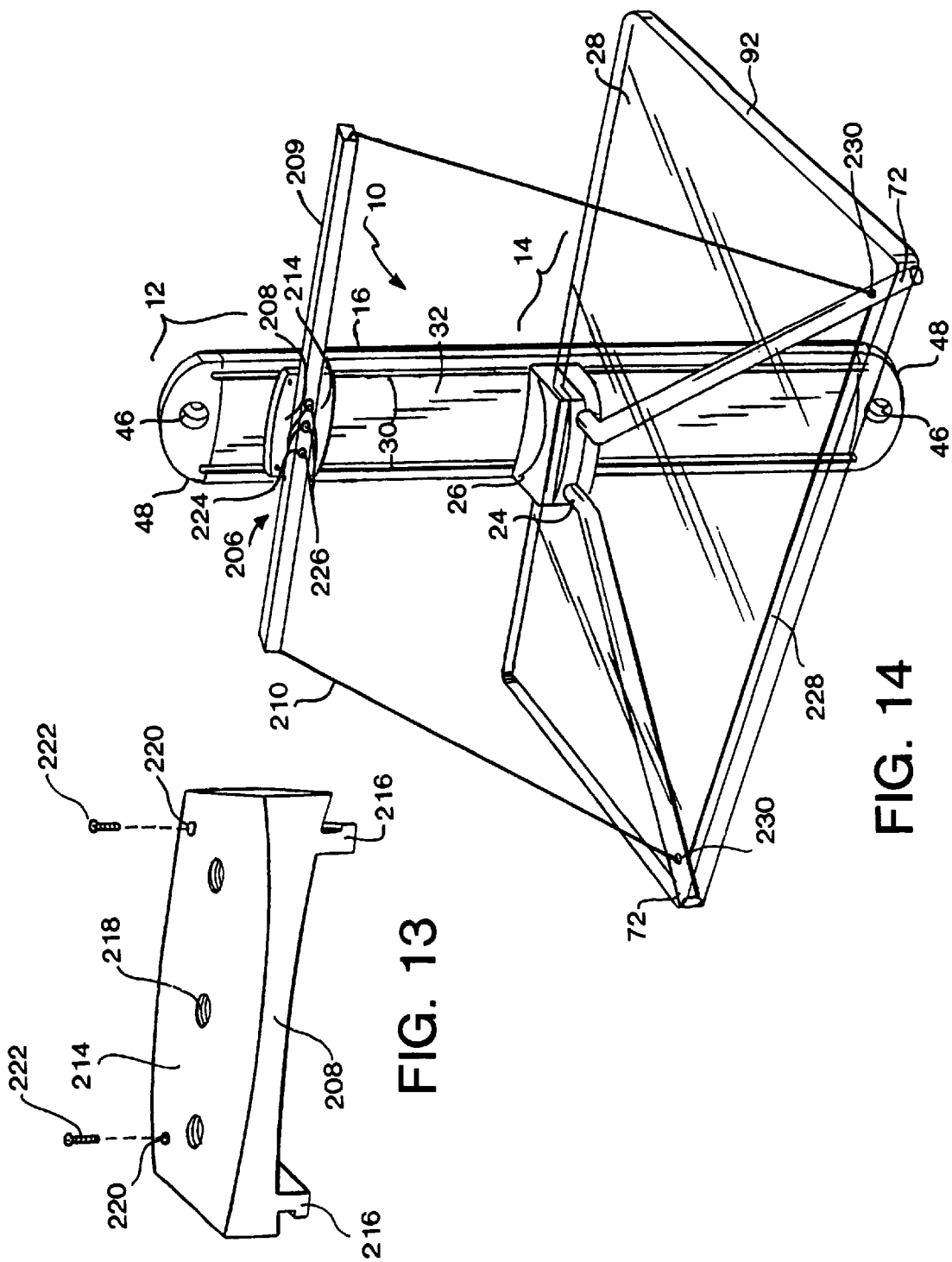

CONTINUOUSLY ADJUSTABLE SURFACE MOUNTING SYSTEM

RELATED APPLICATIONS

This application is related to co-pending U.S. application Ser. No. 08/579,868, filed on Dec. 28, 1995, the content of which is incorporated herein by reference.

FIELD OF THE INVENTION

This invention relates to the field of object supporting systems, and, more particularly, to adjustable surface-mounted systems used to support objects in a range of positions with respect to a mounted surface.

BACKGROUND

Many surface mounting systems exist for supporting objects in particular positions with respect to surfaces on which such systems are mounted. Surface mounting systems exist which may be mounted on vertical and/or horizontal surfaces (e.g., on walls, floors, or ceilings). A common example of such systems is a wall-mounted shelf unit. Several advancements have been made in the adjustable wall-mounted shelving system art, including the ability of a user to adjust the height of shelves in a surface mounting system mounted on a wall. However, the adjustability of shelves in such systems is typically limited to a number of discreet shelf heights to which a shelf may be moved and secured in place. This adjustability limitation is significant when such systems are used for certain purposes in which fine shelf height adjustment is desired. For example, audio/visual equipment components often vary in height. This creates a problem in prior art shelving systems when a tight monolithic look is desired for a number of components supported on separate shelves. Undesirable space and/or inadequate space between components supported on shelves which are not continuously adjustable results in an aesthetically unappealing shelving system. Additionally, the adjustability limitation of conventional systems fails to maximize the use of space on the system. For example, when shelf adjustability on a surface mounting system is limited, space between shelves is often wasted, resulting in a space-inefficient shelving system.

Another problem in prior art shelving systems exists in the case of cantilevered shelves. Specifically, when a cantilevered shelf is loaded (i.e., an object is placed thereon), the shelf tends to tilt or bow in a downward direction under the load. Tilted shelves are undesirable for obvious reasons, including the increased chance of objects sliding or falling off of the shelves). Also, particularly when the load on a shelf is large enough to make the tilt or bow of the shelf visible, such a cantilevered shelf is aesthetically unappealing.

Conventional shelving systems are often not designed to suitably support a wide variety of object types. For example, conventional shelving systems which are suitable for supporting pieces of art or books are typically not best suited for supporting electronic components which often have numerous wires leading to and from each electronic component. Although the term "wires" is used here, it should be noted that this term includes reference to any connection element extending to or from objects placed upon a shelf (such as wiring, cords, plugs, cable, coaxial cable, etc.). Though some shelving systems offer wire management elements or assemblies to arrange and/or hide wires, conventional wire management elements and assemblies do not permit easy insertion and removal of one or more wires from other wires in the wire management elements or assembly. An undesirable compromise is often reached between making wires easily accessible for removal or insertion into a conventional wire management system (usually resulting in increased wire visibility) and hiding wires (usually resulting in less accessible wires).

Other problems with conventional shelving systems are experienced when electronic equipment is supported on shelves. Many pieces of electronic equipment are sensitive to vibration and electromagnetic interference. Especially where a number of pieces of electronic equipment are supported on the same shelving system (with one or more shelves), it is desirable and sometimes necessary to isolate one piece of electronic equipment from another—both vibrationally and electro-magnetically. Vibration from, for example, a CD player on one self may affect a sensitive phonograph on another shelf. As another example, 110 volt power cords running near audio/visual signal cords often result in hum and other forms of radio frequency and electromotive interference between pieces of electronic equipment. Conventional shelving systems typically do not isolate individual pieces of electronic equipment placed on separate shelves in the same shelving system.

It is often desirable to illuminate objects placed upon conventional shelving systems. Unfortunately, lighting systems designed for use with conventional shelving systems typically do not permit easy adjustment of shelves without removing part or all of the lighting system illuminating the shelves. Shelf adjustment in conventional shelving systems usually requires cumbersome removal or loosening of attached lighting systems, including detaching and/or untangling wires, unscrewing or disconnecting contacts, etc. Also, conventional shelving systems do not integrate lighting sources into structural elements of the shelves (e.g., those elements used to support shelves in position, such as cantilevered members). Integrated lighting provides more light point source control on the shelving system, such as control of upwardly or downwardly-directed light on objects supported on the shelves, more even dispersion of light on various areas of the shelving system, etc.

Therefore, a need exists for a surface mounted system which is easily adjustable along a continuous adjustment range, preferably has one or more shelves which are tilt-adjustable to compensate for varying loads on the shelves, provides for wire management which allows easy access to wires running through the system while hiding such wires, offers vibration isolation of each shelf and a manner in which to avoid vibratory interference between shelves and electromagnetic interference between wires running to and from different pieces of electronic equipment supported on the system, and has a lighting system which requires little to no adjustment when shelves are adjusted on the surface mounting system and which is integral with the surface mounted system. The invention as described herein provides such a surface mounting system.

SUMMARY OF THE INVENTION

The surface mounting system of the present invention preferably includes two assemblies: a surface mounted assembly and one or more support assemblies adjustably mounted to the surface mounted assembly. Objects may be placed upon the one or more support assemblies and moved to desired positions by adjusting the locations of support assemblies on the surface mounted assembly.

The surface mounted assembly is preferably an elongated track mounted vertically upon a wall (although other orientations and surfaces are possible) via endcaps which are bolted to the wall. The elongated track preferably has two T-shaped channels running along the length of the track. Each support assembly preferably includes a U-shaped base in which is mounted a cantilevered support member which extends from one end of the U-shaped base. The opposite ends of the U-shaped base preferably terminate in J-shaped curved edges which fit within the channels in the elongated track. As such, the U-shaped base and the cantilevered support member may slide in the channels along the length of the elongated track. Cantilever force exerted on the cantilevered support member causes the cantilevered support member and the attached U-shaped base to rotate, thereby causing the J-shaped curved edges of the U-shaped base to rotate and bind within the channels. By binding at a particular location on the elongated track, the U-shaped base and the cantilevered support member are prevented from further movement in the direction of the exerted cantilever force. For example, in the case where the elongated track is vertically mounted to a wall, the cantilever force exerted by the weight of the support assembly (and object(s) supported thereon) causes the support assembly to bind in place in any desired location along the elongated track. A shelf for supporting objects is preferably secured on top of the cantilevered support member. Thus, the surface mounting system of the present invention provides for support assemblies which are continuously adjustable along any point of the elongated track.

To ensure that forces which are directed opposite to the cantilevered force mentioned above do not inadvertently release the support assembly from its place on the elongated track, the J-shaped curved edges of the U-shaped base may instead be located in separate clip members. The clip members are secured to the sides of the U-shaped base by one screw (for each clip) and have arms extending into holes formed in the sides of the U-shaped base. When the J-shaped edges of the clips bind within the channels of the elongated track, they rotate slightly around their screws and in the holes. The clips can then be secured in place by tightening the screws, thereby locking the support assembly in place against forces exerted from any direction on the support assembly.

It is desirable to be able to adjust the tilt of the cantilevered support member depending upon the amount of cantilever deflection realized by varying loads on the cantilevered support member. The tilt of the support assembly is preferably adjustable by passing two screws through holes in the cantilevered support member and up against the U-shaped bracket. By loosening the fasteners used to secure the cantilevered support member to the U-shaped bracket, adjustment of the two screws causes the cantilevered support member to pivot, thereby changing its tilt.

To improve the aesthetics of a mounting system when objects having wires are supported thereon, at least one wire management shroud is preferably installed flanking the elongated track. Wire management shrouds are preferably made of a flexible plastic material, and each have a number of walls which may be flexed with respect to one another. Each edge of the wire management shroud is preferably attached to a part of the elongated track, at least one of such edges being releasable to permit each wire management shroud to be opened. If clearance between the elongated track and the mounted surface permits, one or both edges of each wire management shroud may even be attached to the rear of the elongated track, in which case the wires may be run within the wire management shrouds alongside and/or behind the elongated track. In this latter design, the elongated track is preferably elevated above the mounted surface by platformed endcaps. By opening the wire management shrouds, access may be gained to the interior of the wire management shrouds (e.g., for inserting or removing wires) at any point along the wire management shrouds. Wires may be run from the electrical components supported on one or more support assemblies to external contacts (e.g., a power source, remote speakers, etc.) or to other components on the surface mounting system. By using two wire management shrouds, power cords and audio/visual cords may be run through separate shrouds, thereby avoiding electrical equipment hum and other forms of radio frequency and electromotive interference.

It is desirable to isolate each support assembly against vibration from the surrounding environment and from other objects on other support assemblies, and to prevent transmission of vibration from each support assembly (or from objects supported thereon) to other elements in the surface mounting system. To this end, shelves upon which objects rest are preferably supported on top of vibration isolation elements (such as rubber or elastomer bushings or strips) which rest in turn upon the cantilevered support member or other parts of the support assemblies.

For aesthetic purposes, to illuminate objects placed upon the surface mounting system, and to illuminate all or part(s) of the surface mounting system itself, an integral lighting system is preferably installed on the surface mounting system. Light elements may be placed within the cantilevered support member, within a housing surrounding part of the support assembly, along one or more edges of system shelves, and/or behind the elongated track. In the first two cases, light holes preferably exist in parts of the cantilevered support member and the housing to permit light to escape. Leads from each lighting element preferably run to the T-shaped channels in the elongated track and are secured therein for electrical continuity/contact against conductors which run the length of the track within the T-shaped channels. The conductors are electrically connected to a power source and/or to a light control device. The leads are secured in place against the conductors by spring-like V-shaped light element connectors releasably fitted within the T-shaped channels. By releasably connecting the light elements in this manner at any location along the elongated track, the light elements associated with any support assembly may be quickly disconnected and connected for easy movement of each support assembly along the elongated track.

Finally, heavier loads may be supported by the cantilevered support member by installing a secondary support assembly on the surface mounting system. Specifically, a secondary support member may be mounted in the channels of the elongated track above a support assembly which is to carry a heavy load. A load carrying member (preferably a cable) is then secured to the secondary support member and to the extended end of a shelf supported upon the cantilevered support member. With the secondary support assembly installed thereon, considerably heavier loads may be carried by a support assembly.

BRIEF DESCRIPTION OF THE DRAWINGS

FIG. 13 is a perspective view of a secondary support element for use with the surface mounting system of the present invention.

FIG. 14 is a perspective view of a fourth embodiment of the present invention, showing the secondary support structure installed thereon.

DETAILED DESCRIPTION

Figure 1:
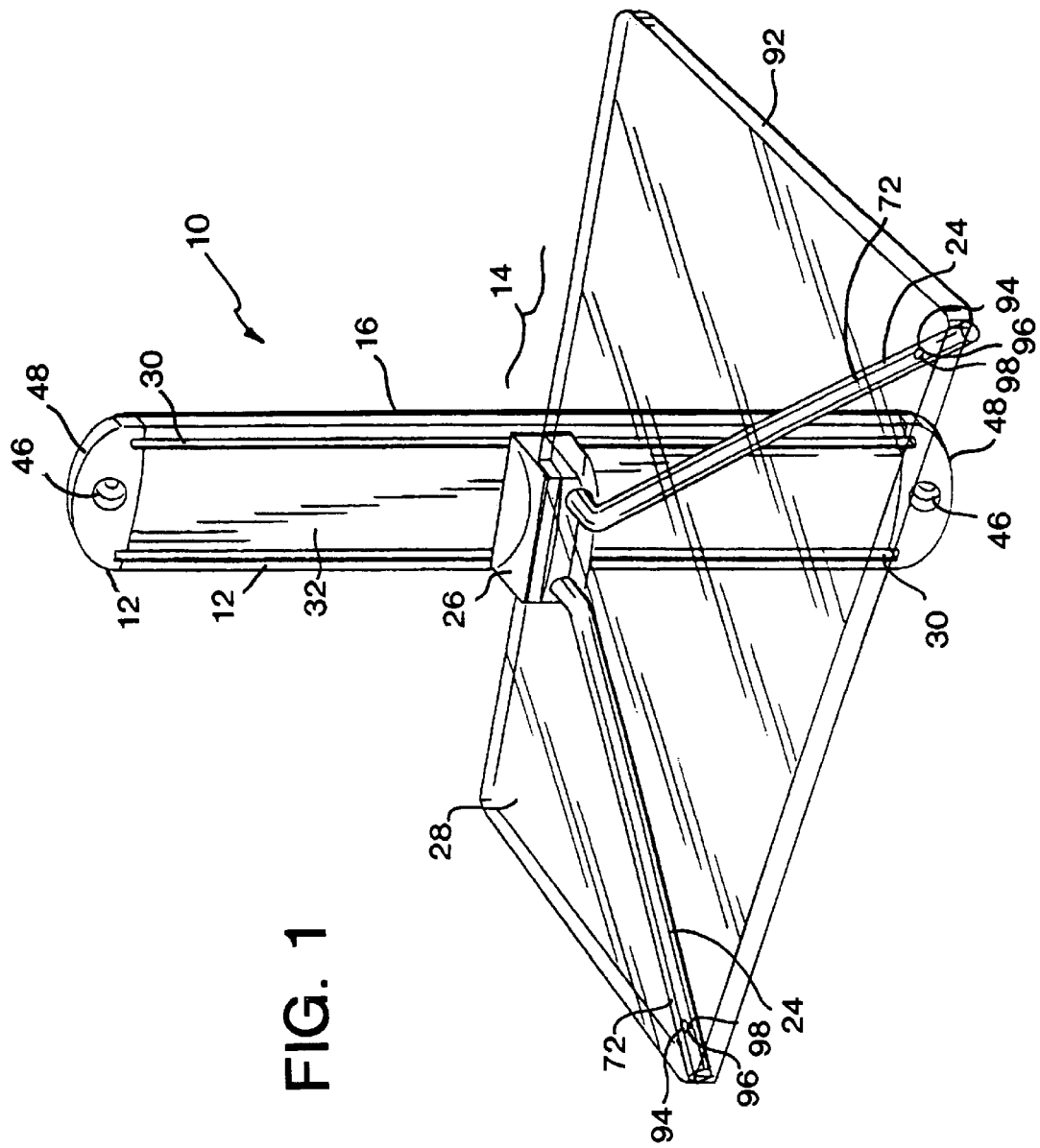
FIG. 1 is a perspective view of the surface mounting system of the present invention, showing one support assembly.

A first embodiment of the present invention is illustrated in FIG. 1. The continuously adjustable surface mounting system of the present invention is designated generally at 10, and includes surface mounted assembly 12 and support assembly 14. Surface mounted assembly 12 includes an elongated track 16, and preferably top and bottom endcaps 48. Support assembly 14 preferably includes a bracket assembly housing 26 for a bracket assembly 22 (see FIG. 2), a cantilevered support member 24, and a shelf 28.

Figure 4:
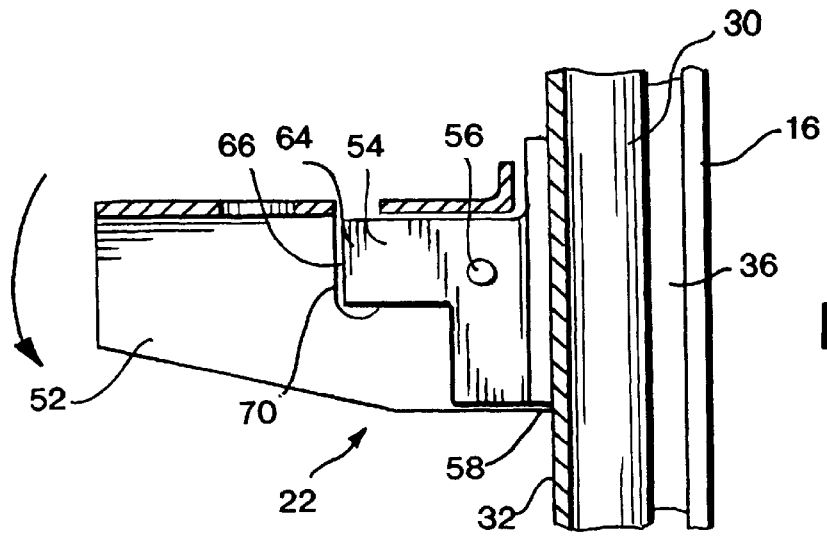
FIG. 4 is a cross-sectional view of the elongated track and connected bracket assembly taken along line 4—4 in FIG. 3, but with the cantilevered support member removed.

Elongated track 16 preferably has two channels 30 formed therein which run the entire length of elongated track 16. A more detailed description of elongated track 16 can be found in co-pending U.S. application Ser. No. 08/579,868, filed Dec. 28, 1995, which is incorporated herein by reference. Channels 30 receive and hold bracket assembly 22 (discussed in more detail below). The preferred cross-sectional shape of elongated track 16 is shown in FIG. 4, where it can be seen that channels 30 preferably have a generally T-shaped cross-section. Elongated track 16 is preferably made of aluminum, but may instead be made of any number of materials, such as iron, steel, and other metals, wood, plastic, composites, ceramics, glass, etc. Though elongated track 16 has a slightly convex front surface 32 selected for aesthetic purposes, other front surface shapes are possible (e.g., concave, flat, ribbed, grooved, etc.) so long as a physical integrity of and spacing between channels 30 in elongated track 16 is maintained.

Figure 2:
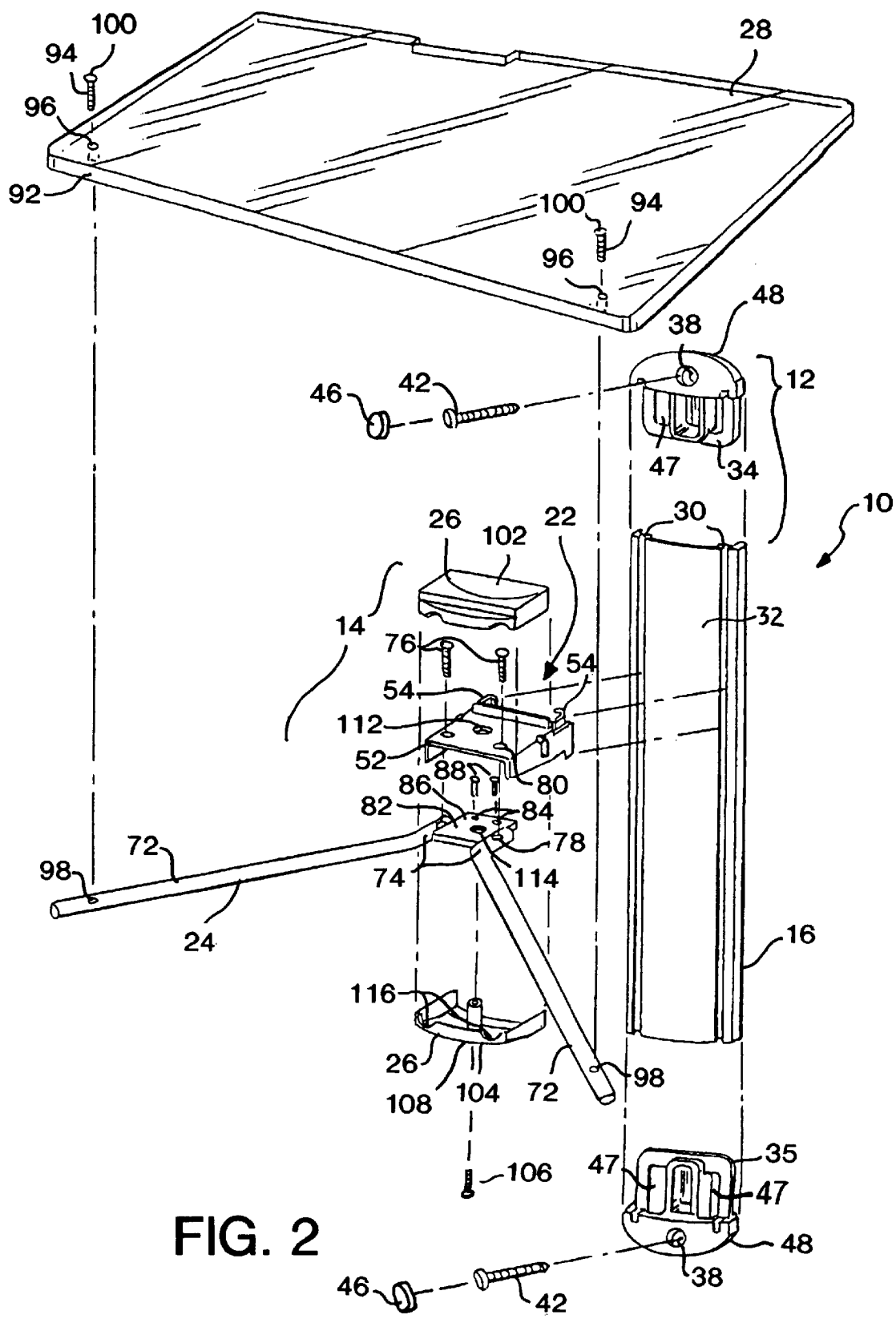
FIG. 2 is an exploded perspective view of the surface mounting system shown in FIG. 1.
Figure 10A:
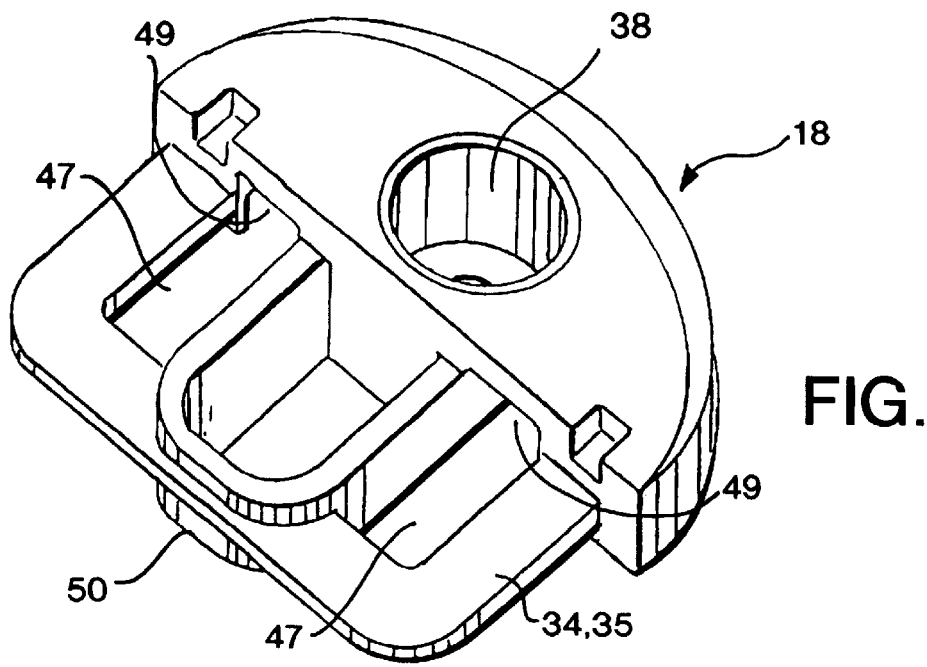
FIG. 10a is a perspective view of a first endcap type for use with the surface mounting system of the present invention.
Figure 10B:
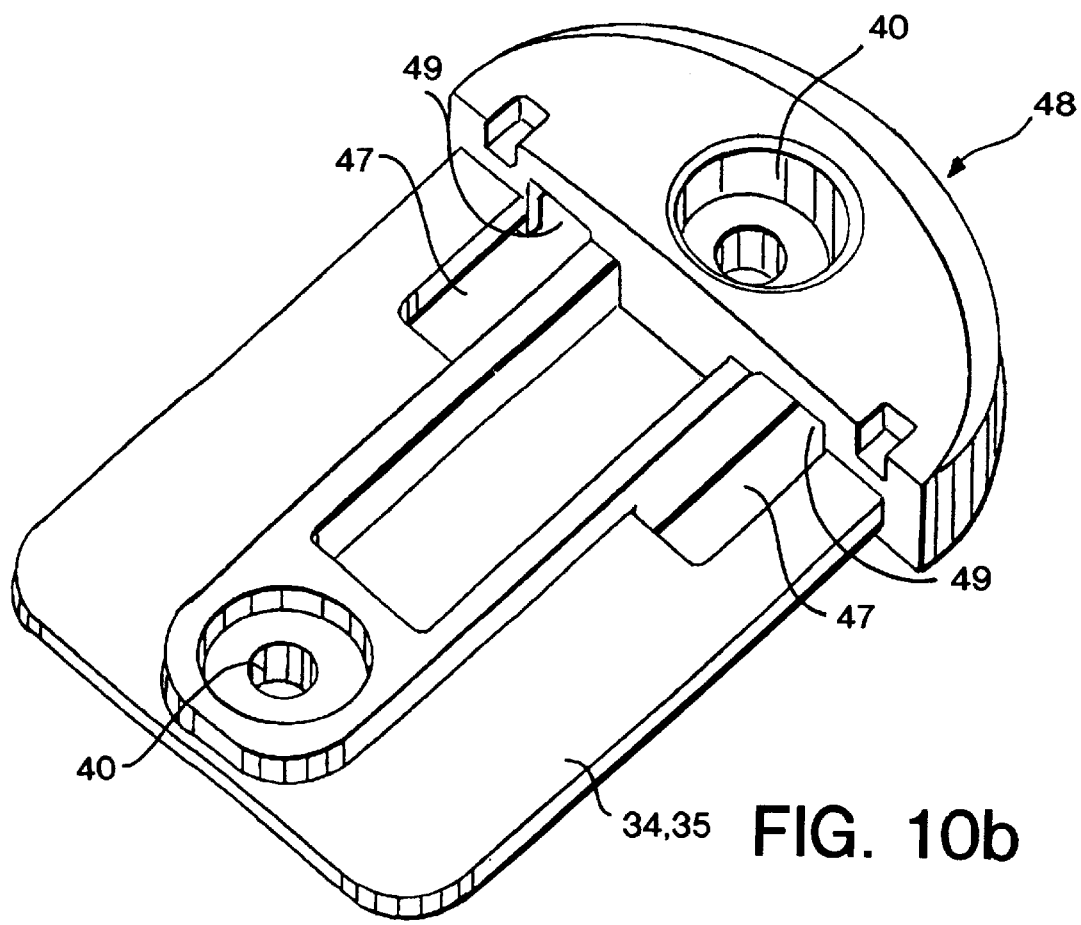
FIG. 10b is a perspective view of a second endcap type for use with the surface mounting system of the present invention.

Elongated track 16 is preferably held in place against a surface (for example, a vertical wall in a home, office, business or other building) by top and bottom endcaps 18 and/or 48. Though different endcaps types are possible, two of which are shown in FIGS. 10a and 10b, endcaps 18, 48 share some basic features. Each endcap has a tongue 34, 35 which fits into grooves 36 in elongated track 16, shown best in FIGS. 4 and 5. Each endcap 18, 48 has at least one hole 38,40 formed therethrough for attachment of the endcap to a surface. In the preferred embodiment of the present invention, the top endcap has one mounting hole 38 (see, for example, endcap 18 shown in FIG. 10a), while the bottom endcap preferably has two mounting holes 40 (see, for example, endcap 48 shown in FIG. 10b). As shown in FIG. 2, to mount endcaps 48 to a surface, screws 42 are passed through mounting holes 38, 40 and into the mounted surface. Though screws 42 are preferably used to mount endcaps 48, other fasteners may be used, such as nails, bolts, etc. Mounting holes 38, 40 may be recessed as shown in FIGS. 10a and 10b, which recesses 44 may be covered by caps 46 to hide the heads of screws 42 (for aesthetic purposes). To couple elongated track 16 to endcaps 48, tongue 34, 35 of each endcap 48 is inserted into grooves 36 in elongated track 16 (see FIG. 2). Other coupling means are possible, such as by attaching endcaps 48 to elongated track 16 using fasteners, bonding endcaps 48 to elongated track 16, etc. However, the tongue-and-groove method of coupling endcaps 48 to elongated track 16 is preferred because such a method avoids the need for additional fasteners and permits fast assembly and disassembly of surface mounted assembly 12.

Endcaps 18, 48 are preferably provided with wire management holes 47 through their respective tongues 34, 35. As described below with respect to the remainder of the wire management and lighting systems of the present invention, power, lighting, signal, and other wires may be run up or down to endcaps 18, 48, respectively, from various locations on the surface mounting system 10. After reaching endcaps 18, 48, wires may then be passed through wire management holes 47 in endcaps 18, 48 and to the surface on which the surface mounting system is mounted (for running to different locations, for running through a wall, etc.). In this regard, conventional electrical connection to conventional power and control devices may be made behind the surface mounting system via, for example, one or more single gang J boxes located behind elongated track 16 and/or endcaps 18, 48. By running wires in this manner, the aesthetic appearance of the system is improved and excess wire length may be hidden (by being stuffed behind hollow areas 49 in endcaps 18, 48, for example). Though wire management holes 47 are preferably provided in tongues 34, 35 of endcaps 18, 48 to hide holes 47 when endcaps 18, 48 are connected to elongated track 16, wire management holes 47 may be located through other parts of endcaps 18, 48. The exact location of wire management holes 47 will depend largely upon the exact shape and manner of connection of endcaps 18, 48, as well as the desired appearance of the surface mounting system.

An important difference between the endcap 48 shown in FIG. 10b and the endcap 18 shown in FIG. 10a is the inclusion of platform 50 with endcap 18. When tongue 34, 45 of an endcap 48 is inserted into grooves 36 in elongated track 16, both the endcap 48 and the elongated track 16 sit flush against the surface onto which the surface mounted assembly 12 is mounted. However, when tongue 34, 35 of endcap 18 is inserted into grooves 36 in elongated track 16, elongated track 16 is elevated a distance above the mounted surface. This elevated mounting arrangement leaves a space—preferably 0.5 inches (12.7 mm) in depth—between the mounted surface and elongated track 16. The purpose of this elevated mounting arrangement will be discussed later.

When an elevated mounting arrangement is utilized, then both the top and bottom endcaps are provided with platforms 50. When a non-elevated mounting arrangement is used, then platforms 50 are omitted from both the top and bottom endcaps. In the Figures, reference number 48 is used to refer to endcaps (top and bottom) without platform 50, while reference number 18 is used to refer to endcaps (both top and bottom) with platforms 50.

Endcaps 18, 48 are preferably made of aluminum. However, as with elongated track 16, endcaps 18, 48 may instead be made of any number of materials, such as iron, steel, and other metals, wood, plastic, composites, ceramics, glass, etc.

As shown in FIGS. 1 and 2, support assembly 14 includes bracket assembly 22, cantilevered support member 24, bracket assembly housing 26, and shelf 28. Bracket assembly 22 includes base 52, clips 54 and clip fasteners 56 (see FIGS. 3–5). Base 52 is preferably U-shaped and has a pair of legs 58 extending from the rear of base 52. As best seen in FIG. 4, legs 58 fit inside channels 30 in elongated track 16. Clips 54 are secured to sides 60 of base 52 by clip fasteners 56, which are screws in the preferred embodiment of the present invention. As described in more detail below, during installation or movement of support assembly 14 on elongated track 16, clips fasteners 56 are left untightened, thereby allowing clips 54 to rotate slightly around clips fasteners 56. Clip fasteners 56 need only be tightened when the support assembly "quick release" feature (described below) is not desired. Each clip 54 has one hook-shaped edge 62 which is located proximate the rear of base 52 when installed thereon. The hook-shaped edge 62 of each clip 54 extends inside channel 30 in elongated track 16 alongside base leg 58. Clip 54 also has a clip leg 64 extending from an edge of clip 54 opposite hook-shaped edge 62. Clip leg 64 is hook-shaped to be loosely received in an opening 66 in a side 60 of base 52. The resulting arrangement of base 52, clips 54, clip fasteners 56, base legs 58 base sides 60, hook-shaped edges 62, clip legs 64, and openings 66 as described above serve the purpose of locking bracket assembly 22 into place within channels 30 in elongated track 16 as follows. Once legs 58 of base 52 and hook-shaped edges 62 of clips 54 are inserted into channels 30 as shown in FIG. 4, a downward cantilever force exerted upon bracket assembly 22 causes legs 58 of base 52 to rotate inside channels 30 in a direction shown in FIG. 4. Since clips 54 are secured by clip fasteners 56 to base 52, clips 54 are then forced to rotate with legs 58. However, due to the hook shape of hook-shaped edges 62 in T-shaped channels 30, clips 54 stop the rotation of base 52. The rotational force thereby exerted by clips 54 in channels 30 causes bracket assembly 22 (and the entire support assembly 14) to lock into place within elongated track 16.

It should be noted that if the arrangement and relationship of elements in bracket assembly 22 were just as described above (i.e., with clip fasteners 56 not tightened), if bracket assembly 22 were lifted by an upward force (e.g., on base 52, shelf 28, etc.), hook-shaped edges 62 of clips 54 in channels 30 would release from their locked positions within channels 30, thereby freeing the entire support assembly 14 to move along elongated track 16. This "quick release" feature may not be desirable, since an inadvertent exertion of upward force on support assembly 14 would cause support assembly 14 (and anything supported thereon) to fall. As described below, when clips 54 are tightened against base 52 via clip fasteners 56 such "quick release" is prevented. In other words, by employing clips 54 attached to base 52 with clip fasteners 56 as described above, movement of support assembly 14 in channels 30 may be prevented even if an upward force is exerted on bracket assembly 22. Specifically, when clips 54 and legs 58 are first inserted into channels 30, clip fasteners 56 are loosened so that clips 54 may slightly rotate around clip fasteners 56 (note also the loose fit of clip legs 64 within base openings 66 mentioned above). Once support assembly 14 is placed in a desired position on elongated track 16, the cantilevered weight of assembly 14 causes bracket assembly 22 to rotate in the direction shown by the arrow in FIG. 4. Loosened clips 54 are inhibited from such rotation, since they are caught in T-shaped channels 30, but legs 58 of bracket assembly base 22 rotate slightly until they are stopped by engaging either the interior walls 68 of channels 30 or until clip legs 64 abut against an edge 70 of openings 66 in base 52 (see FIGS. 4 and 5). Clip fasteners 56 may then be tightened, thereby locking bracket assembly 22 in place in channels 30—even against an upward force exerted against support assembly 14.

Those skilled in the art should appreciate the fact that if support assembly 14 needs only operate in a "quick release" mode, then clips 54 and clip fasteners 56 should not be necessary. In such an embodiment, clips 54 would be omitted, and legs 58 of base 52 would be given the hook shape of hook-shaped clip edges 62 (described above) to perform the same locking function as clips 54.

As best seen in FIG. 4, hook-shaped edges 62 of clips 54 are preferably J-shaped, and hook into T-shaped channels 30 of elongated track 16. One arm (preferably the inwardly-directed arm) of the T-shaped channel is preferably longer than the other. It will be appreciated that other shapes of channels 30 and clips 54 are possible, each serving the same function as the T-shape of channels 30 and the J-shape of hook-shaped clip edges 62 in terms of supporting support assembly 14. In each shape combination (i.e., the mating shapes of channel 30 and edges 62), channels 30 have a section or wall onto which an edge of clips 54 abut when clips 54 are inserted into channels 30. For example, channels 30 and the hook-shaped edges 62 of clips 54 may be L-shaped, J-shaped, U-shaped, etc. As with the preferred embodiment shown in FIGS. 4 and 5, the shapes of channels 30 and hook-shaped clip edges 62 need not match (e.g., an L-shaped clip edge may be fitted inside a T-shaped channel). It will also be appreciated that where channels 30 are intended to carry relatively heavy loads or where elongated track 16 is made from material which is not strong enough to carry heavy loads, channels 30 may be deepened, lengthened, or reinforced by lining channels 30 in a conventional manner with a stronger material.

Clip fasteners 56 are preferably screws, but a number of other releasable fasteners (such as bolts or other threaded fasteners) may be used instead.

To support one or more objects at a selected location along elongated track 16 (i.e., at a selected height when surface mounting system 10 is mounted in a generally vertical orientation), cantilevered support member 24 is attached to bracket assembly 22 and supports shelf 28 in a horizontal position. In the preferred embodiment shown in the figures, cantilevered support member 24 is provided with a pair of round tubes 72, each being attached at one end 74 to base 52 of bracket assembly 22. Tubes 72 preferably extend away from one another (in a generally Y-shaped configuration) to provide a stable support structure for other support elements and objects placed thereon. Other tube shapes and configurations are possible. For example, rather than being round, tubes 72 may have square, triangular, rectangular, or other cross-sectional shapes, and may be hollow or solid. Also, rather than having a Y-shaped configuration, tubes 72 may form any number of shapes, (such as a V, a T, etc.). Other examples of possible tube configurations include tubes having a zig-zagged series of bends, tubes which are shaped with one or more tight or wide curves, tubes which are shaped so that they join or are attached together at one or more points, etc. Tubes 72 may even be replaced by a single tube shaped to have both of its ends attached to base 52 of bracket assembly 22. In each case, tube(s) 72 are attached to base 52 of bracket assembly 22 and provide a supporting structure for other support elements and for objects placed thereon.

Figure 3:
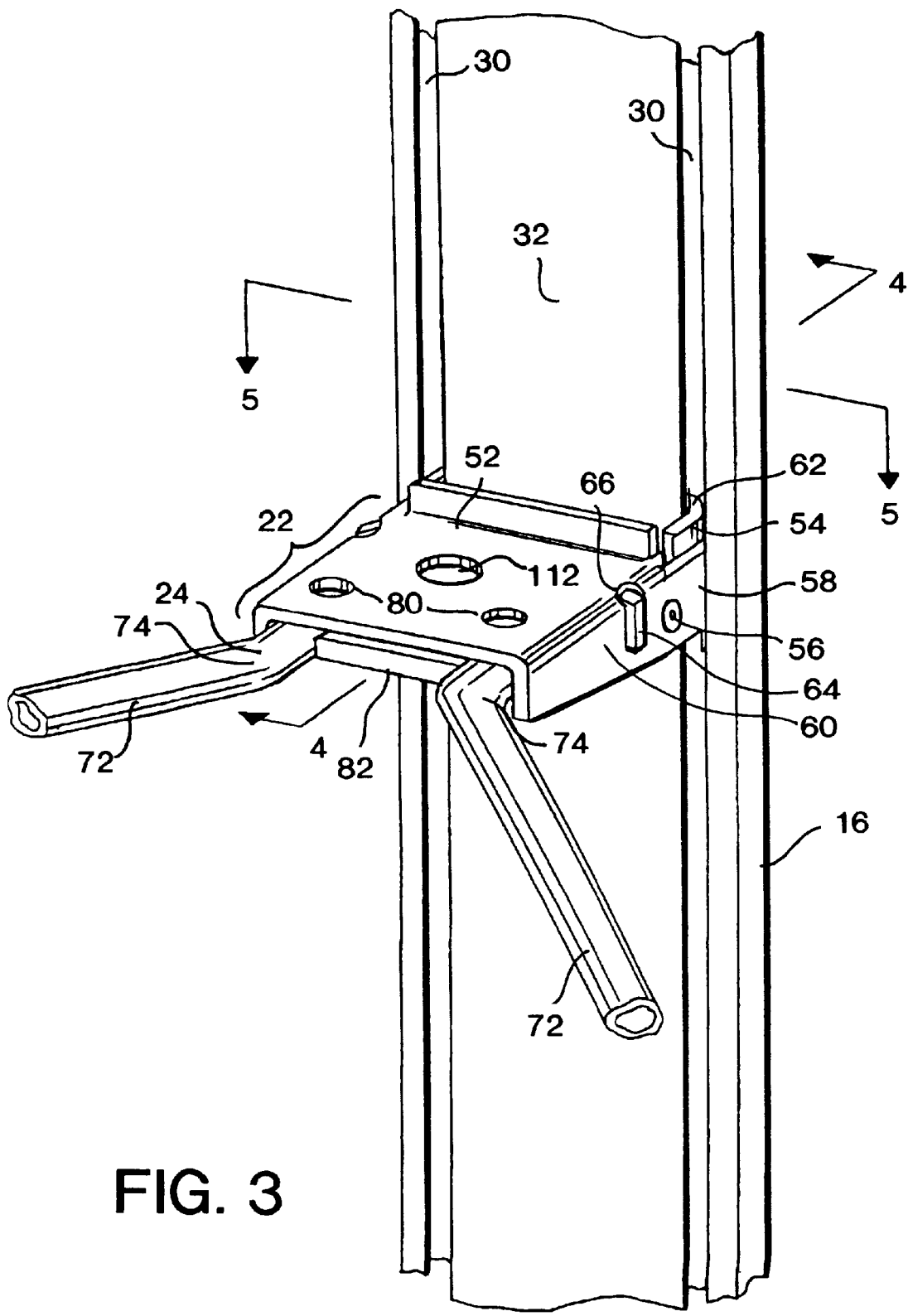
FIG. 3 is perspective view of a support assembly with the bracket assembly housing removed and with arrows indicating the direction of cantilever force acting upon the support assembly.
Figure 5:
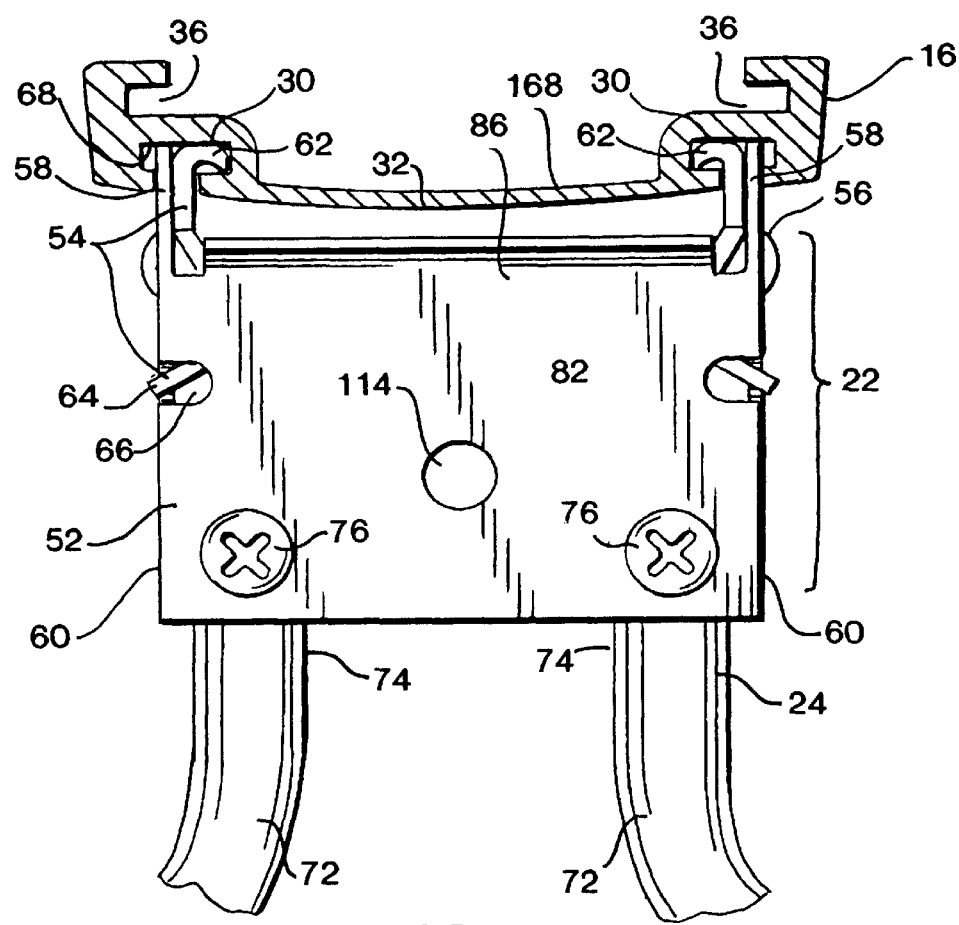
FIG. 5 is a cross-sectional view of the bracket assembly, elongated track, and cantilevered support member taken along line 5—5 in FIG. 3.

As best shown in FIGS. 2 and 5, tubes 72 are attached directly to base 52 of bracket assembly 22 by tube fasteners 76, which preferably are a pair of bolts—one for each tube end 74. Threaded tube fastener holes 78, 80 are provided through tubes 72 and through base 52, respectively, to receive tube fasteners 76 passed therethrough. Because tube fasteners 76 may be used to adjust the tilt of tubes 72 as described in more detail below, tube fasteners 76 are preferably screws (or other adjustable or threaded fasteners such as bolts). However, tubes 72 may be fastened to base 52 in a number of different manners (some permitting the tilt adjustment described below and some not), such as by screwing, riveting, welding, gluing, etc. Especially where tilt adjustment is desired, it is preferred to attach tubes 72 together at a location proximate their attachment to base 52 of bracket assembly 22. Such an attachment ensures that tilt of one tube 72 accompanies tilt of another attached tube 72. As shown in FIGS. 2 and 3, tubes 72 are preferably attached together by support plate 82. More specifically, the ends of tubes 72 are preferably welded to opposite sides of support plate 82, which by virtue of being welded at the middle point of each tube is positioned a distance above base 52 of bracket assembly 22.

Once support assembly 14 is fixed in place along elongated track 16 and a load is placed upon support assembly 14, tubes 72 will likely not assume a perfectly horizontal cantilevered position. As such, it is desirable to be able to adjust the tilt position of tubes 72 with respect to bracket assembly 22. For this purpose, two threaded tilt adjustment holes 84 are provided in a rear section 86 of support plate 82. By passing tilt adjustment screws 88 through threaded tilt adjustment holes 84 and by adjusting tilt adjustment screws 88 so that they abut and push against base 52 of bracket assembly 22, rear section 86 of support plate 82 is pushed away from base 52. When tube fasteners 76 are loose (not tightened), this movement tilts support plate 82 about tube fasteners 76, thereby tilting tubes 72 (and anything mounted or supported thereon) with respect to bracket assembly 22 and surface mounted assembly 12. Although tilt adjustment holes 84, support plate rear section 86, and tilt adjustment screws 88 are preferably used as described to adjust the tilt of tubes with respect to bracket assembly 22 and surface mounted assembly 12, other combinations of elements well known in the art may be used to achieve the same result (raising one plate with respect to another). For example, rather than abut against rear section 86 of support plate 82, tilt adjustment screws 88 may be passed from the opposite direction as described above through a pair of threaded holes (not shown) in base 52 and abut against rear section 86 of support plate 82.

Though tilt adjustment screws 88 are described above for adjusting the tilt position of tubes 72 (and objects placed thereon) to compensate for tilt caused by cantilevered loading on tubes 72, this tilt adjustment feature may also be used to mount surface mounting system 10 on an inclined surface. In such a case, elongated track 16 is mounted in an inclined orientation (e.g., one endcap 18, 48 being placed forward of the other endcap 18, 48), and tilt adjustment screws 88 are adjusted to bring tubes 72 to a horizontal position.

The elements which make up bracket assembly 22 (including base 52 and clips 54) and cantilevered support member 24 (including tubes 72 and support plate 82) are preferably made of a high strength metal such as steel or aluminum. However, any or all elements of bracket assembly 22 and cantilevered support member 24 may be made from a number of other materials, including other metals, composites, plastics, wood, ceramics, glass, etc., the selection of materials used depending upon the desired aesthetics, anticipated uses and loading of bracket assembly 22 and cantilevered support member 24.

To provide a flat surface onto which supported objects may be placed, shelf 28 is preferably provided, and rests on top of tubes 72. For aesthetic purposes, shelf 28 is preferably made of transparent or semi-transparent acrylic or glass. However, other shelf materials may be used, such as metal, wood, composites, plastic, etc. For lighting purposes as discussed below, edges 92 of shelf 28 may be frosted or polished depending upon the desired appearance of shelf 28. The thickness and the exact material used to make shelf 28 will be largely dependent upon the intended uses of shelf 28 (e.g., what loading shelf 28 is intended to support) and the desired appearance of shelf 28. Shelf 28 is preferably secured to tubes 72 by shelf fasteners 94, which are shown in FIG. 2 as being two threaded fasteners passing through shelf holes 96 and mating threaded tube holes 98—one in each tube 72. Though two threaded fasteners (e.g., machine screws) are shown securing shelf 28 to tubes 72, more or fewer fasteners (requiring more or fewer threaded tube holes, respectively) may be used. Also, alternatives to the use of threaded tube fasteners may be used to secure shelf 28 to tubes 72. Such alternatives include securing shelf 28 via bonding material, epoxy, glue, etc., and welding or riveting shelf 28 to tubes 72. Where shelf fasteners 94 are threaded fasteners the heads 100 of these fasteners may be countersunk into shelf 28 to provide a smooth and aesthetically pleasing surface on shelf 28.

To hide the elements which connect surface mounted assembly 12 and support assembly 14 together, thereby presenting a more pleasing appearance of the surface mounting system, bracket assembly housing 26 encloses bracket assembly 22 and part of cantilevered support member 24 (tube ends 74 and support plate 82). Bracket assembly housing 26 preferably consists of upper section 102 and lower section 104 connected together with housing fastener 106. Upper section 102 and lower section 104 are preferably made of molded plastic, but may instead by made of a number of different materials, such as metal, wood, glass, ceramics, composites, etc. Housing fastener 106 is preferably a screw, and secures upper section 102 and lower section 104 in place by passing through countersunk housing fastener hole 108 in lower section 104 and into a mating threaded housing fastener hole 110 (not shown) in upper section 102. To enable this connection, base 52 of bracket assembly 22 and support plate 82 are provided with through holes 112, 114, respectively, through which housing fastener 106 and connected parts of upper section 102 and lower section 104 pass as shown in FIG. 2. Bracket assembly housing 26 also has tube through holes 116 therein through which tubes 74 pass (see FIG. 2). Tube through holes 116 may pass only through upper section 102, lower section 104, or (as shown in FIGS. 1 and 2) may be defined by part of upper and lower sections 102, 104. Though bracket assembly housing 26 is described above as being made of an upper and a lower section 102, 104 fastened together with one threaded fastener 106, different housing elements, configurations, and fastening methods are possible. For example, bracket assembly housing 26 may consist of three or more sections, may have snap fasteners which allow housing sections to be snap-fit together (rather than screwed together), etc. Though bracket assembly housing styles may vary, each style of bracket assembly housing preferably performs the general aesthetic purpose of covering bracket assembly 22 and part of cantilevered support member 24. In this connection, it should be noted that the shape of bracket assembly housing shown in FIGS. 1 and 2 is largely selected for aesthetic purposes (with exceptions noted below), and may differ depending upon the desired appearance of the bracket assembly housing.

Figure 6:
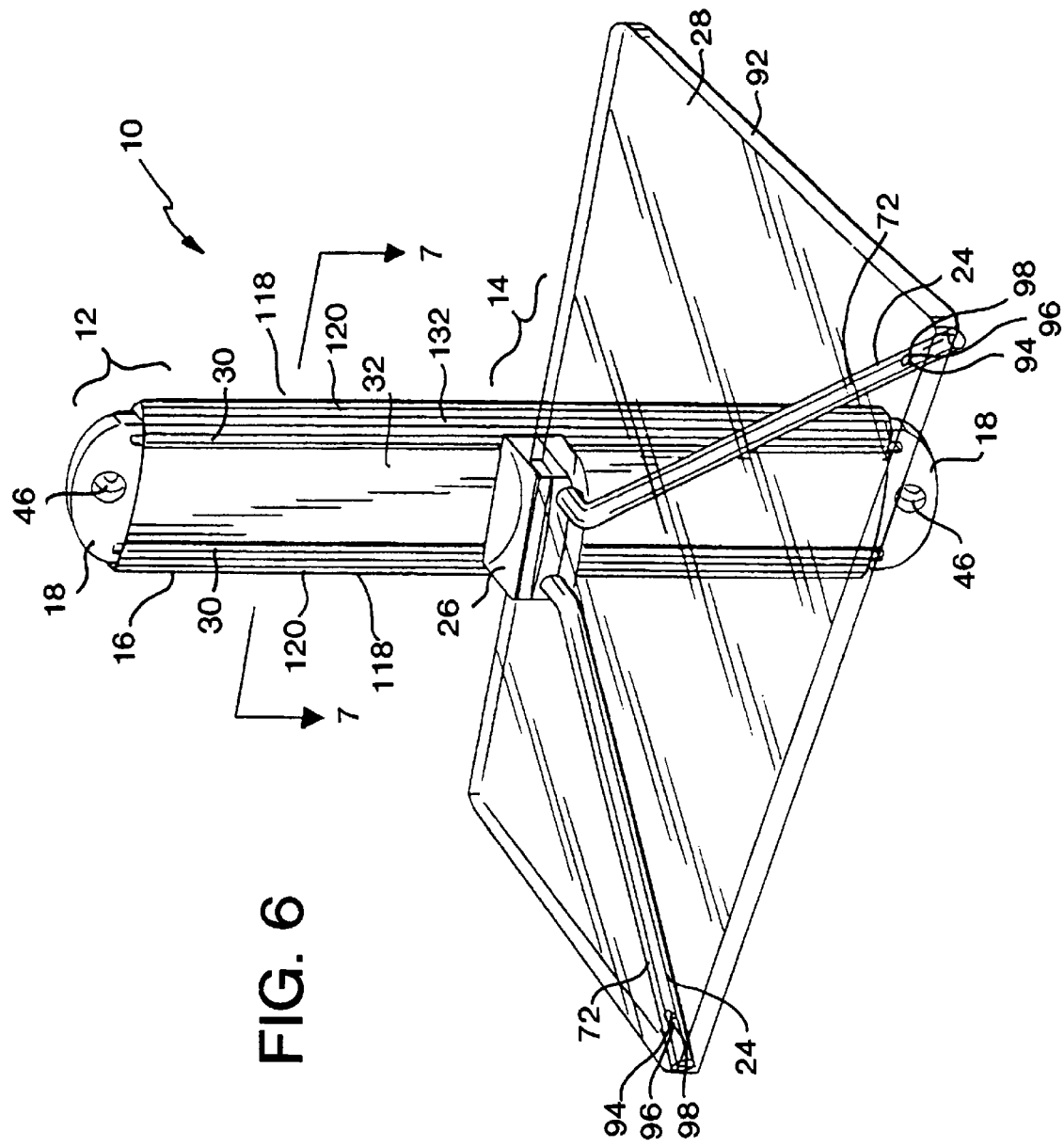
FIG. 6 is a second embodiment of the surface mounting system of the present invention, showing wire management shrouds installed thereon.
Figure 7:
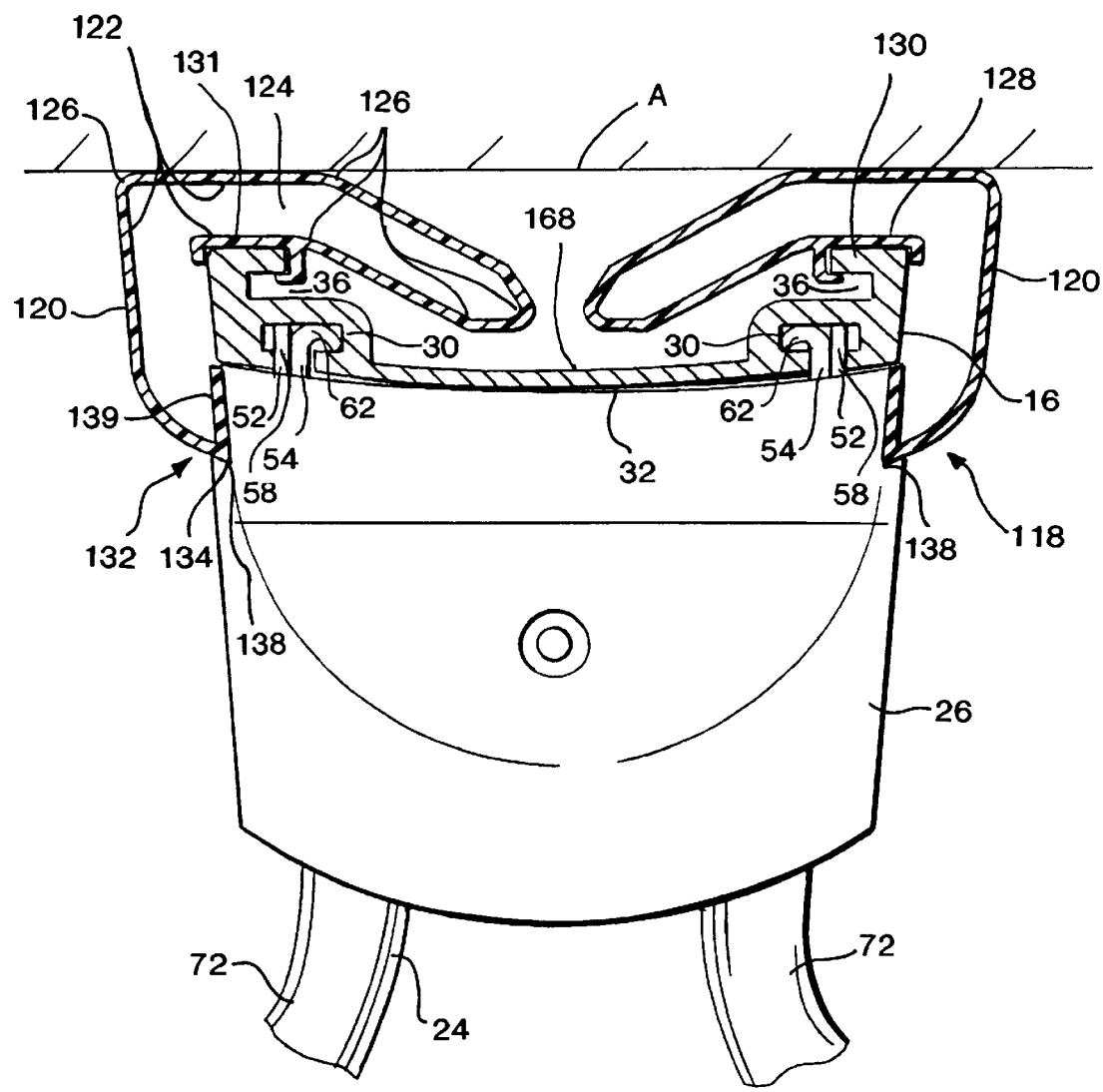
FIG. 7 is a cross-sectional view of the second embodiment of the surface mounting system taken along line 7—7 in FIG. 6.

An optional feature used with the surface mounting system is the wire management system (indicated generally at 118) shown installed on the surface mounting system in FIGS. 6 and 7. Wire management system 118 includes one or more shrouds 120 attached to surface mounted assembly 12 and support assembly 14. Shrouds 120 may be any length, but preferably run along substantially the entire length of elongated track 16. As indicated in FIG. 7, each shroud preferably has a number of walls 122 which are connected together by joints 126 to define a hollow interior 124 bound by one or more walls (and possibly part of surface mounted assembly 12 and/or support assembly 14). Preferably, at least one of the joints 126 connecting walls 122 together is flexible, allowing shroud 120 to be opened and closed by a user as described below. For this purpose, shrouds 120 are preferably made of a deformable material (such as plastic, nylon, rubber, urethane etc.) which is soft enough to permit walls 122 to rotate about joints 126 (which act as hinges between walls 122), but which is firm enough to retain a set shape. Though not themselves permitting the hinged movement just described, other shroud materials are possible, including metal, glass, ceramic, composites, etc. Since joints 126 are the only parts necessary in shrouds 120 to provide the hinged movement of walls 122, walls 122 may be made of rigid material bonded together (e.g., by glue, bonding, rivets, clamps, etc.) with joints made of flexible material. The preferred embodiment shrouds 120 shown in FIG. 2 are entirely made of ABS copolymer extruded plastic having areas of thinner material (not shown) between walls 122 to define joints 126 permitting hinged movement of adjoining walls 122.

A preferred cross-sectional shape of shrouds 120 is shown in FIG. 7, the cross-sectional shape defining a hollow interior 124 which runs preferably alongside and preferably behind part of elongated track 16 (which is shown mounted a to surface A). One edge 128 of the preferred embodiment of shroud 120 is attached to elongated track 16 by fitting snugly around rear wall 130 with a gripping protrusion 131 of elongated track 16 as shown. Walls 122 join in series from edge 128 around an interior portion of track 16 to the front of elongated track 16. A last wall 122 in the aforementioned preferable series abuts against elongated track 16 proximate front surface 32. To keep the front 132 of shroud 120 in place against elongated track, a corner 134 defined by the last wall 139 and next-to-last wall in the aforementioned series of walls 122 of shroud 120 is shaped to fit notch 136 in bracket assembly housing 26 of a support assembly 14 installed on elongated track 16 (see FIGS. 7 and 11b). With shroud 120 being secured on one side by edge 128 and on another side by corner 134 in notch 136, the preferred embodiment of shroud 120 shown in FIGS. 6 and 7 keeps its place alongside elongated track 16. If desired, the last wall 139 may be omitted.

For shrouds which extend behind elongated track 16 (such as the preferred embodiment shrouds 120 shown in FIGS. 6 and 7), sufficient clearance is necessary between elongated track and a surface onto which it is mounted to receive the shroud section extending behind elongated track 16. To achieve this purpose, endcap 18 shown in FIG. 10a has a platform 50 which raises endcap tongue 34, 35 a distance above the mounted surface. Specifically, when elongated track 16 is installed on endcaps 18 by inserting endcap tongues 35 into grooves 36 in elongated track 16, elongated track 16 is held in an elevated position over the mounted surface. This elevated arrangement allows shrouds 120 to extend behind elongated track 16 to provide additional wiring space.

Shrouds 120 are used to house and hide wires which lead to and from equipment placed on each support assembly 14. Although the term "wires" is used herein, it should be noted that this term includes reference to any connection element extending to or from things placed upon support assemblies 14, such as wiring, cords, plugs, cable, coaxial cable, etc.). Wires may be run from the equipment to the hollow interior 124 of shrouds 120, preferably at a point directly behind the equipment. The wires may be run along the entire length of shrouds 120 inside hollow interior 124, and may run to and from the surface mounting system (external wire feeds) via endcaps 18 as described above and/or from one piece of equipment on one support assembly 14 to another piece of equipment on another support assembly 14 (interconnects) on elongated track 16. Preferably, two shrouds 120 are installed alongside elongated track 16 to house different types of equipment wires, thereby avoiding problems of signal noise, radio frequency interference, electromotive interference, etc. For example, all 110 volt lines and speaker wires running to and from support assemblies 14 can be placed in one shroud 120, while all audio/visual signal wires can be placed in another shroud 120.

To gain access to hollow interior 124 for inserting or removing wires into shroud 120, shrouds 120 may be entirely removed from their place alongside elongated track 16. Due to the flexible nature of shrouds 120, removal of shrouds 120 may be performed before or after wires have been inserted within shrouds 120 and after elongated track 16 has been installed in place using end caps 18. Similarly, the flexible nature of shrouds 120 permits shroud installation without disturbing wire placement—even after wires have been put in place along elongated track 16. As an alternative to the complete removal of shrouds 120 from their place along elongated track 16, the preferred embodiment of the present invention takes advantage of the flexible nature of joints 126 between walls 122. Specifically, flexible joints 126 permit a user to pull the exposed portion of shroud 120 away from elongated track 16 (without completely removing shroud 120) to gain access to hollow interior 124 at any point along the length of shroud 120. Preferably, corner 134 of shroud 120 is released from notch 138 in bracket assembly housing 26 (permitted by the flexible nature of joints 126 and walls 122). Freeing shroud 120 from this securement point on elongated track 16 permits walls 122 to be flexed open for inserting or removing wires in shroud 120. After changing the wiring as desired, corner 134 can be easily snapped back into place in notch 138.

As another feature to assist in inserting or removing wires in shroud 120, the last wall 139 of shroud 120 may be made of thinner flexible material to permit that wall 139 to be easily moved for access to hollow interior 124 of shroud 120.

It will be appreciated that the specific shape of shroud 120 and hollow interior 124, the number and dimensions of walls 122, and their relationship to one another may vary greatly, yet still perform the same basic functions described above: hiding wires within shroud 120 and along elongated track 16, and permitting easy access to shroud interior 124 via flexible joints 126 and/or flexible walls 122. Specifically, shrouds 120 may have a more rounded appearance, a "fat" appearance, or a flat appearance, and may be much thicker or thinner than shown in the figures. The exact dimensions and appearance of shrouds 120 will depend upon several factors, including the height that elongated track 16 is supported above a surface, the number of wires intended to be run through shrouds 120, desired aesthetics, etc.

Figure 8:
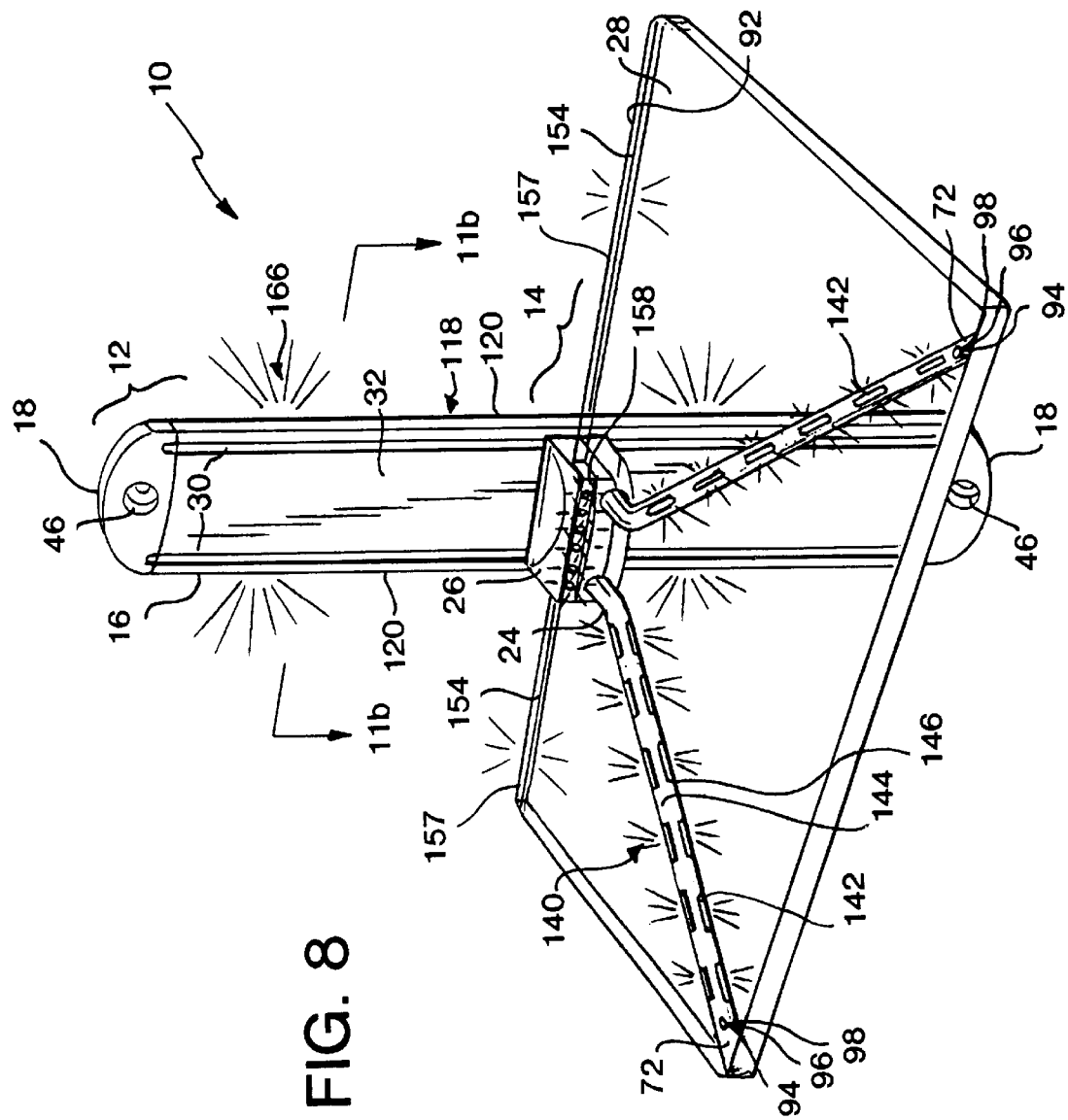
FIG. 8 is a third embodiment of the surface mounting system of the present invention, showing a lighting system installed therein.
Figure 9:
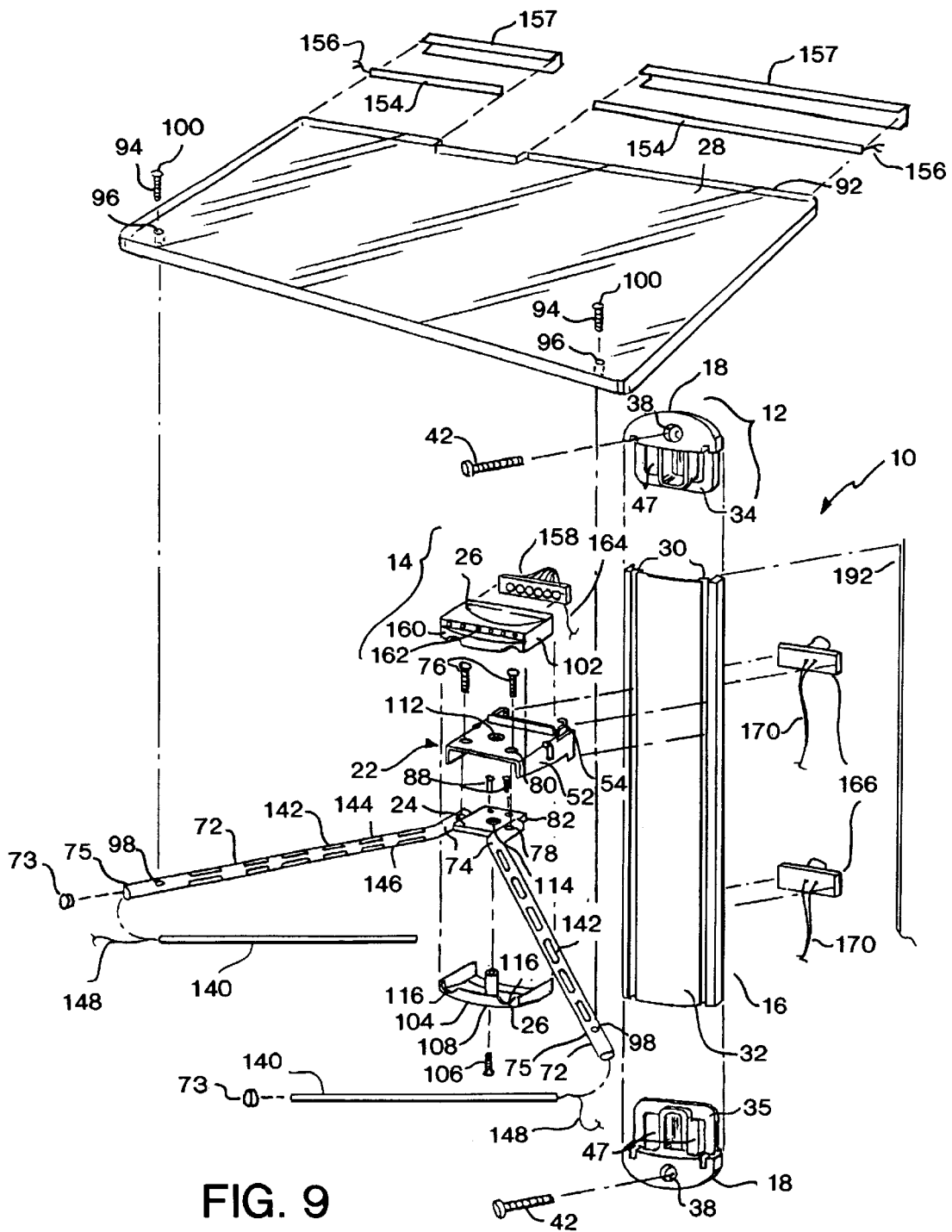
FIG. 9 is an exploded perspective view of the third embodiment of the present invention.

Another optional feature of the mounting system is an integral lighting system to illuminate parts of the surface mounting system and/or objects placed thereon. Lightbulbs may be attached or inserted in a number of locations in the surface mounting system to achieve this effect. With reference to FIGS. 8 and 9, tube lighting elements 140 well known in the art are inserted within tubes 72. Preferably, tube lighting elements 140 are lighting strips. However, any other lighting device (as are well known in the art) may instead be used. To permit light to escape from within tubes 72, tube light holes 142 are formed or cut in the walls of tubes 72. In the preferred embodiment shown in FIGS. 8 and 9, tube light holes 142 are elongated, and are located on top surface 144 and bottom surface 146 of tubes 72 to direct light above and below tubes 72. Two separately controllable tube lighting elements 140 may be inserted within each tube 72—one for emitting light out of tube light holes 142 in top surface 144 of tubes 72 and one for emitting light out of tube light holes 142 in bottom surface 146 of tubes 72. Only one tube lighting element is shown in each tube in FIG. 9. Tube endcaps 73 are preferably fitted in ends 75 of tubes 72 to present a more aesthetic appearance of tubes 72. As described in more detail below, tube lighting elements 140 are connected via leads 148 to a power source 150 and/or a controller 152 (not shown), the controller 152 being used for turning tube lighting elements 140 on and off, for dimming tube light elements 140, etc.

As shown in FIG. 9, another lighting element type is preferably installed on an edge 92 of shelf 28. Specifically, shelf edge lighting element 154 (two of which are shown in FIG. 9) is held against a rear edge 92 of shelf 28 by a molding piece 157 which is preferably a C-shaped channel sized to snugly fit along edge 92 of shelf 28. C-shaped channel 157 may be made from metal, wood, plastic, glass, composites, or a number of other material types. Like tube lighting elements 140, shelf edge lighting element 154 is preferably a lighting strip. However, any number of different lighting devices well known in the art may be used instead. Also, though a C-shaped channel is preferably used to hold shelf edge lighting element 154 in place against edge 92 of shelf 28, several other ways of holding shelf edge lighting element 154 in place exist (such as by gluing, screwing, nailing, etc.). As described in more detail below, shelf edge lighting element 154 is connected via leads 156 to power source 150 and/or a controller 152 (not shown), controller 152 being used for turning shelf edge lighting element 154 on and off, for dimming shelf edge lighting element 154, etc.

A third lighting element is preferably secured within bracket assembly housing 26 to emit light from within bracket assembly housing 26 in a forward direction, thereby illuminating shelf 28 and an object supported thereon. Specifically, bracket assembly housing lighting element 158 is secured within bracket assembly housing 26 in a conventional manner (e.g., by gluing, bonding, welding, riveting, screwing, bolting, etc.) either against an interior wall of bracket assembly housing 26 or against a part of bracket assembly 22, support plate 82, or tube ends 74. Bracket assembly housing lighting element 158 may be any type of lighting element well known in the art. In front wall 160 of bracket assembly housing 26 lighting holes 162 are provided to permit light to escape from bracket assembly housing 26 in a forward direction. As described in more detail below, bracket assembly housing lighting element 158 is connected via leads 164 to power source 150 and/or controller 152, controller 152 being used for turning bracket assembly housing lighting element 158 on and off, for dimming bracket assembly housing lighting element 158, etc.

A fourth lighting element is preferably secured behind elongated track 16 to emit backlight from behind elongated track 16. Specifically, backlight element 166 is secured to a rear surface 168 of elongated track 16 in a conventional manner (e.g., by gluing, bonding, welding, riveting, screwing, bolting, etc.). Multiple backlight elements 166 or one long backlight element 166 may be secured to rear surface 168 of elongated track 16 in order to backlight a length of or the entire elongated track 16. Backlight element 166 may be any type of lighting element well known in the art. As described in more detail below, backlight element 166 is preferably connected via leads 170 to power source 150 and/or controller 152 for turning backlight element 166 on and off, for dimming backlight element 166, etc.

Figure 11A:
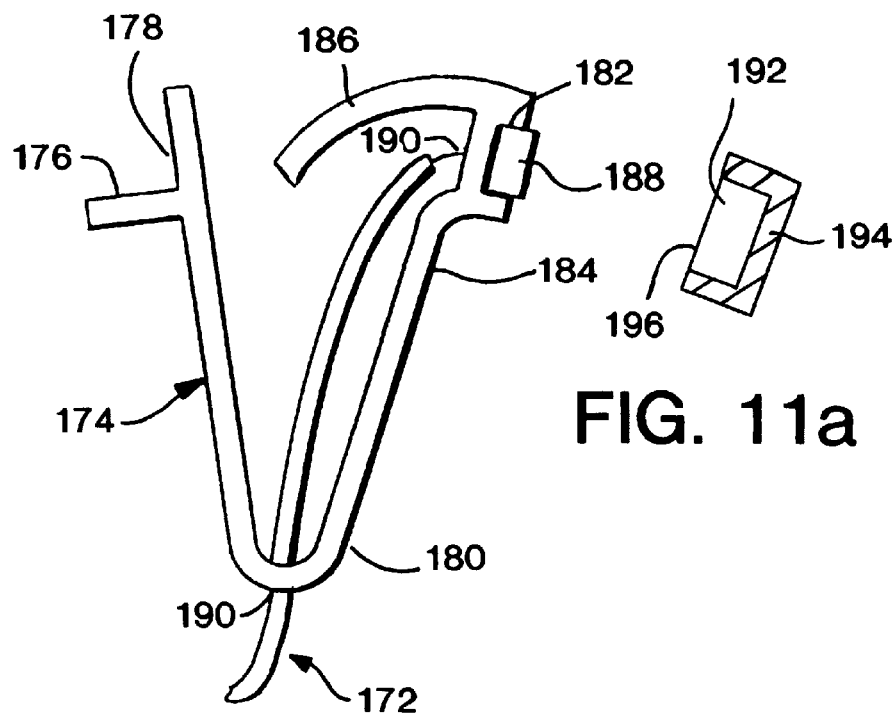
FIG. 11a is an elevational view of a light element connector used with the surface mounting system of the present invention, the light element connector being shown in its unloaded position.
Figure 11B:
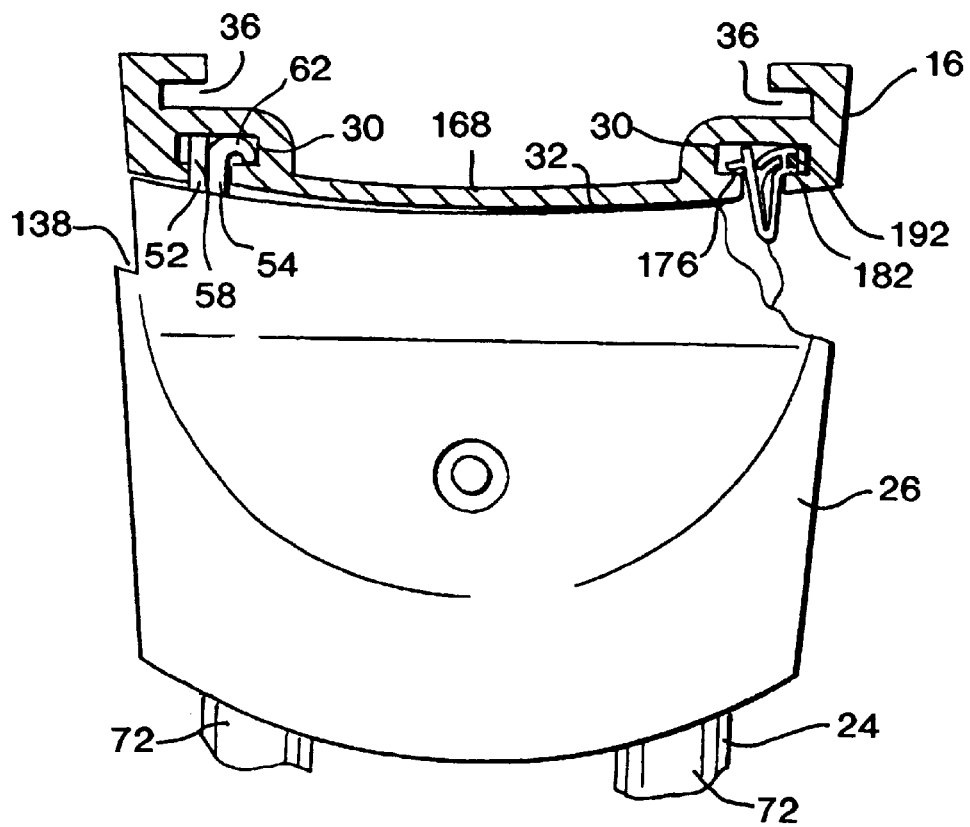
FIG. 11b is the cross-sectional view of FIG. 7 without the shrouds, partially-sectionalized to show an installed light element connector.

Leads 148, 156, 164, and 170 of light elements 140, 154, 158, and 166, respectively, each preferably extend from their respective light elements to terminal ends proximate channels 30 in elongated track 16. The terminal end of each lead 148, 156, 164, and 170 (indicated generally as 172 in FIG. 11a) is attached to a light element connector 174 which fits inside channel 30 as shown in FIG. 11b. Light element connector 174 is preferably a V-shaped extrusion made out of resilient plastic having a high memory (i.e., resistant to permanent deformation). As shown in FIG. 11a, light connector element has an arm 176 laterally extending from a first end 178 of V-shaped body 180 and a U-shaped recess 182 on a second (opposite) end 184 of V-shaped body 180. Also, the second end 184 of V-shaped body 180 terminates in a curved spring hook 186. A contact 188 is secured in U-shaped recess 182 in a conventional manner (e.g., being press fit therein, being glued or bonded, etc.). With reference to FIG. 11a, the terminal end 172 of each lead 148, 156, 164, 170 extends through V-shaped body 180 via two lead holes 190 and is attached by conventional means (e.g., crimped, soldered, etc.) to contact 188. Contact 188 is preferably brass, but may be made from other electrically conductive materials.

To connect light element connectors 174 to a power source 150 and/or to a controller 152 (not shown) for powering and controlling light elements installed throughout the surface mounting system, light element connectors 174 are compressed and inserted into channels 30 of elongated track 16. In particular, the V-shaped body 180 of the light element connector 174 is compressed, pushing curved spring hook 186 against first end 178 of V-shaped body 180. Curved spring hook 186 exerts a reactionary force to the compression, pushing first and second ends 178 and 184 of V-shaped body 180 apart. When this reactionary force is exerted while light element connector 174 is inserted within channel 30 as shown in FIG. 11b, curved spring hook 186 pushes arm 176 into one end of T-shaped channel 30, while U-shaped recess 182 and contact 188 are pushed into an opposite end of T-shaped channel 30.

Though preferably made from resilient plastic, light element connector 174 may instead be made from a number of other resilient materials capable of exerting a spring force when compressed (such as spring steel, resilient composites, etc.).

As shown in FIGS. 9, 11a, and 11b, an elongated track conductor 192 is preferably press fit into one end of each T-shaped channel 30 (only one elongated track conductor 192 is shown in FIG. 9). Elongated track conductor 192 may be secured from movement within T-shaped channel by other means (such as with glue, epoxy, etc). Elongated track conductor 192 is preferably an insulated copper wire, but may be any long insulated element made from electrically conductive material. As best shown in FIG. 11a, elongated track conductor 192 is provided with electrical insulation 194 on all but one exposed side 196. Exposed side 196 of elongated track conductor 192 is positioned so that it is not in electrical communication with any part of elongated track 16.

When light element connectors 174 (with attached leads 148, 156, 164, 170) are installed into channel 30 in elongated track 16 as described above, the spring force exerted by curved spring hooks 186 presses contacts 188 against exposed sides 196 of elongated track conductors 192 to establish electrical communication of light elements 140, 154, 158, and 166 to elongated track conductors 192, which themselves are electrically connected at an end of elongated track 16 to power source 150 and/or to controller 152 (not shown) via wire management holes 47 in endcaps 18 (see above).

It will be appreciated that other spring elements (e.g., helical springs, leaf springs, etc.) and connection designs (U-shaped light element connector body, light element connectors which are press fit within channels 30, etc.) can be used to establish and maintain electrical contact between leads 148, 156, 164, and 170 of light elements 140, 154, 158, and 166 and elongated track conductors 192 in channels 30. Such other spring elements and connection designs are considered to fall within the scope and breadth of the present invention.

By connecting light elements 140, 154, 158 and 166 via leads 148, 156, 164, and 170, respectively to power source 150 and/or to controller 152 (not shown) as just described, leads 148, 156, 164, and 170 may be quickly connected and disconnected from their positions on elongated track 16, thereby permitting support assembly 14 to be quickly moved along or removed from elongated track 16. An alternative to the light element connector design described above (for connecting light elements 140, 154, 158 and 166 to power source 150 and/or to controller 152) is to run leads 148, 156, 164, and 170 directly to power source 150 and/or to controller 152 (not shown) via shrouds 120 and wire management holes 47 in endcaps 18 in a manner as described above for running wires to and from elements supported on support assembly 14.

For maximum control over the integral lighting system of the present invention, it is desirable to be able to separately control each light element 140 (each tube lighting element being separately controllable), 154, 158, and 166. Controllers 152 which can be used to control the power supplied to a number of lighting elements are well-known in the art, and are not therefore discussed further. Controller 152 preferably permits a user to adjust the integral lighting system of the present invention such that each of the two tube lighting elements are separately controlled, thereby permitting a user to turn on, off, and dim one or both of the tube lighting elements 140 which emit light out of tube light holes 142 in the bottom surface 146 of tubes 172 and the tube lighting elements 140 which emit light out of tube light holes 142 in the top surface 144 of tubes 172. With such control, a user may control the upward light emitting from tubes 72 separately from downward light emitting from tubes 72 (dimming, intensifying, turning on, and turning off such light). In a similar manner, the other lighting elements 154, 158, 166 in the integral lighting system are separately controllable to dim, intensify, turn on, and turn off light emitting from one or more of these lighting elements, thereby separately controlling the lighting of shelf edges and surfaces, areas above and/or below each shelf, and backlighting of the surface mounted system. Conventional lighting controllers may also turn off and turn on the dimming feature of lights connected thereto.

The lighting elements 140, 154, 158, and 166 mentioned above may be of a number of different types well-known in the art, such as incandescent, halogen, neon, and florescent lights, strip lights, miniature lights, etc.

Figure 12:
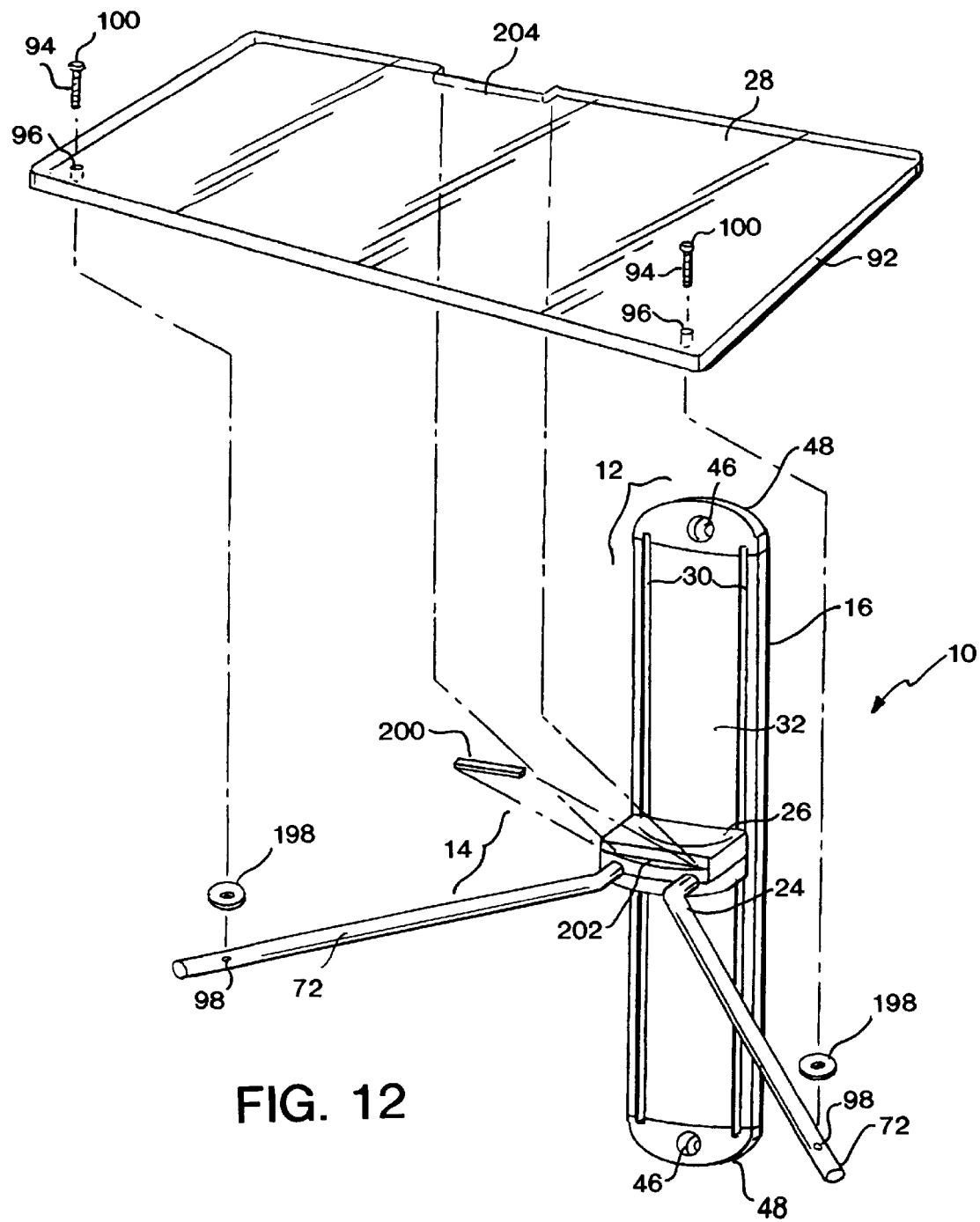
FIG. 12 is an exploded perspective view of the surface mounting system of the present invention showing vibration isolation elements installed therein.

Yet another optional feature of the present invention is illustrated in FIG. 12. To isolate objects placed upon support assembly 14 against vibration (e.g., from other objects placed upon other support assemblies on the surface mounting system, from environmental vibration surrounding the surface mounting system, etc.) and to protect shelf 28 from shock and resulting breakage, each shelf 28 preferably rests not directly on tubes 72 of cantilevered support member 24, but on vibration isolation elements 198, 200 which themselves rest upon elements of support assembly 14. In the preferred embodiment shown in FIG. 12, vibration isolation elements 198 support the front and middle areas of shelf 28, while vibration isolation element 200 supports the rear of shelf 28. Vibration isolation elements 198 are shown sandwiched between shelf 28 and tubes 72 in FIG. 12. Though vibration isolation elements 198 may be attached in a conventional manner (e.g., glue, epoxy, etc.) to tubes 72 and shelf 28, vibration isolation elements 198 are preferably donut shaped elastomers and are mounted between shelf 28 and tubes 72 by shelf fasteners 94 which are passed through shelf holes, isolation elements 198 and threaded tube holes 98. In FIG. 12, two vibration isolation elements 198 are shown between shelf 28 and tubes 72. However, any number of vibration isolation elements 198 having varying shapes and sizes may be used.

Vibration isolation element 200 is preferably an elastomer strip which may be attached in a conventional manner (e.g., glue, epoxy, etc.) to a front ledge 202 of bracket assembly housing 26. The rear 204 of shelf 28 is supported on top of vibration isolation element 200. As with vibration isolation elements 198 supporting shelf 28 on tubes 72, vibration isolation element 200 may also be secured to shelf 28 in any number of manners well known in the art. Though only one vibration isolation element 200 is shown supporting rear 204 of shelf 28 in FIG. 12, any number of vibration isolation elements 200 having varying shapes and sizes may be used.

The effect of supporting shelf 28 on vibration isolation elements 198, 200 in the manner described above is to isolate shelf 28 (and objects supported thereon) from exposure to surrounding vibration and to prevent vibration on shelf 28 (or from objects supported thereon) from being transmitted to other parts of the surface mounting system or to the surrounding environment. In particular, the front and middle areas of shelf 28 are isolated from tubes 72 via vibration isolation elements 198, while the rear 204 of shelf 28 is isolated from bracket assembly housing 26 via vibration isolation element 200.

Vibration isolation elements 198, 200 are preferably made of rubber. However, other elastomeric materials having vibration absorbing properties may instead be used, such as urethane, plastic, etc.

Another feature of the present invention is preferably employed in cases where support assembly 14 is used to carry a relatively heavy object or objects. In such cases, secondary support assembly 206 (see FIGS. 13 and 14) is installed on surface mounting system 10 to more evenly distribute the load across surface mounting system 10. Secondary support assembly 206 includes secondary support 208, cable 210, and threaded fasteners 226. Secondary support 208 is preferably an aluminum extrusion having a body 214 with two L-shaped legs 216 extending from one surface. Body 214 has a number of threaded support holes 218 therethrough, and two threaded setscrew holes 220 extending through body 214 and legs 216. L-shaped legs are sized and spaced to fit within channels 30 of elongated track 16, with body 214 of secondary support 208 spanning front surface 32 of elongated track 16. When loaded with a cantilevered weight, secondary support 208 binds in place in elongated track 16 in a manner similar to the bracket assembly 22 described above. To further secure secondary support 208 in place on elongated track 16, setscrews 222 are tightened in setscrew holes 220. Secondary support 208 is secured a distance above the support assembly 14 which it is to support. Preferably, hollow cable bar 209 is secured to secondary support 208 by threaded fasteners 226, which pass through holes 224 in cable bar 209 and into threaded support holes 218 in secondary support 208. Cable 210 is passed through hollow cable bar 209. Cable 210 is also passed to a front area 228 of shelf 28, where it passes through aligned shelf support holes 230 in shelf 28 and tubes 72. The ends of cable 210 are preferably attached together beneath shelf 28 in a conventional manner. By using the secondary support arrangement described above, load exerted on support assembly 14 is distributed partly along cable 210 to secondary support 208 secured in place a distance above support assembly 14. Such an arrangement permits greater loads to be carried by support assembly 14. Other conventional manners of attaching hollow cable bar 209 to secondary support 208 are possible. Also, hollow cable bar 209 may instead be a channel (rather than a hollow bar), or any other device which guides cable 210 laterally away from secondary support 208 to each side of shelf 28.

Figure 15:
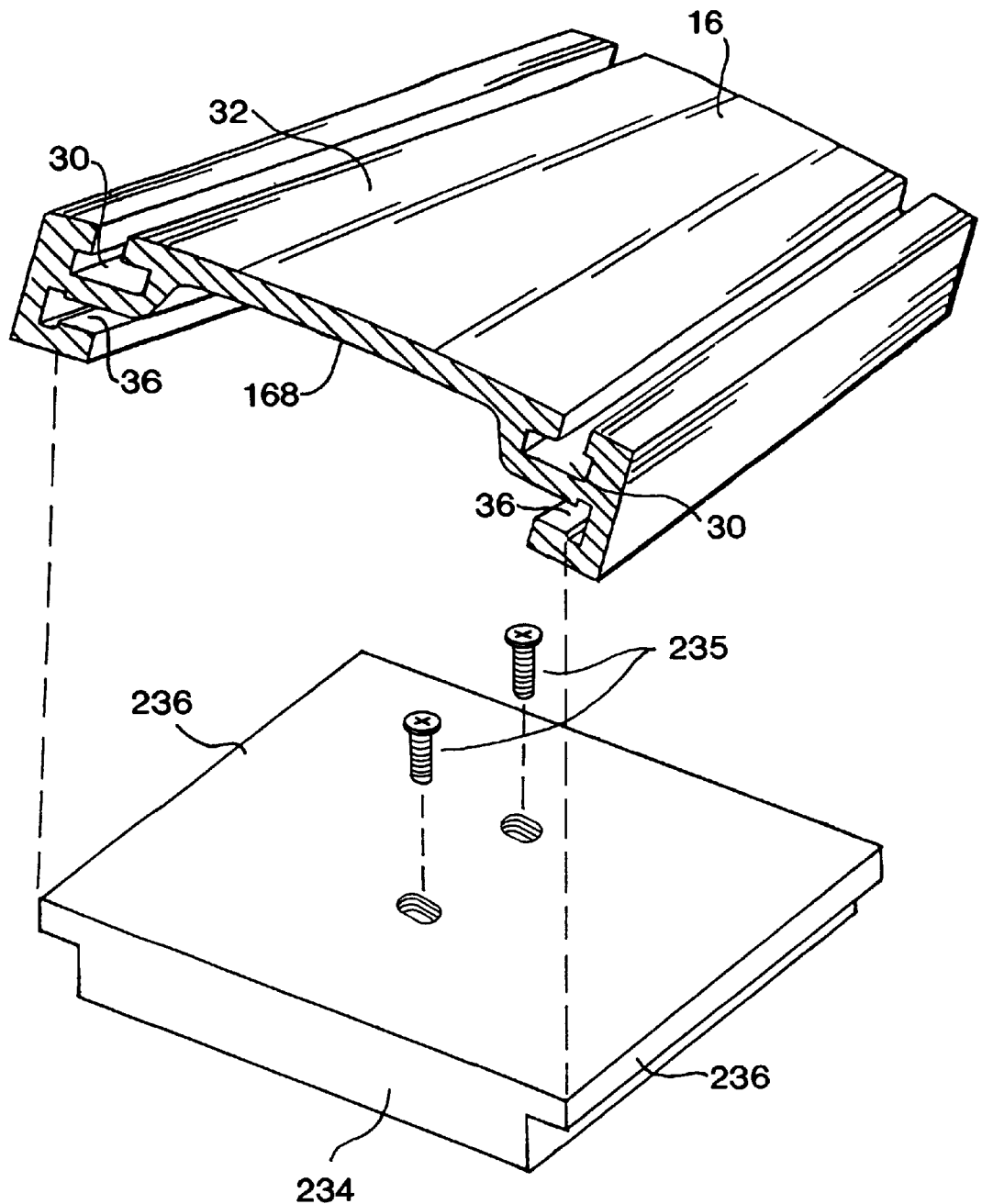
FIG. 15 is an exploded perspective view of an intermediate track support and a segment of the elongated track installed thereon.

It will be appreciated by one skilled in the art that the secondary support 208 described above can be adapted for attachment directly to a support assembly (e.g., can form the base 52 of bracket assembly 22 to which cantilevered support member 24 may be directly attached in a conventional manner). For example, cantilevered support member 24 may be welded, bolted, clamped, threaded into, or attached in a number of conventional manners directly to secondary support 208, which is then locked into place by tightening setscrews 222. Though this alternative to the preferred embodiment of the present invention described above and illustrated in the drawings does not have the tilt adjustment feature of the preferred embodiment, this alternative may be desirable from a standpoint of a more simple design.

Where longer elongated track lengths are desired or where heavy loads are to be supported by elongated track 16, elongated track 16 may be installed on intermediate track supports 234 located behind elongated track 16 and between endcaps 18, 48. As shown in FIG. 15, intermediate track supports 234 are preferably mounted to a surface via threaded fasteners (such as bolts) 235 in a manner similar to the surface mounting of endcaps 18, 48. Intermediate track supports 234 have tongues 236 which slide within grooves 36 in the rear of elongated track 16. The number and placement of intermediate track supports 234 hidden behind elongated track 16 depends largely upon the anticipated loading of surface mounting system 10. As with endcaps 18, 48, intermediate track supports 234 are preferably made of aluminum. However, intermediate track supports 234 may instead be made of any number of materials, such as iron, steel, and other metals, wood, plastic, composites, ceramics, glass, etc.

It should be noted that while secondary support 208 is preferably made from aluminum, other materials (such as steel, iron, and other metals, plastics, composites, etc.) can also be used which provide a strong mount from which loads can be carried. Additionally, other conventional methods of securing secondary support 208 in place (rather than setscrews 222) on elongated track 16, for securing cable 210 to secondary support 208, and for securing cable 210 to shelf 28 are possible and are well-known in the art.

Various changes in the details, materials and arrangement of parts which have been herein described and illustrated in order to explain the nature of the present invention may be made by those skilled in the art within the principle and scope of the invention as expressed in the following claims. For example, the embodiments of the present invention have all been described as having two channels 30 in elongated track 16. More or fewer channels 30 are possible, depending upon the intended uses of the surface mounting system, the loads to be carried by each support assembly 14 and by surface mounted assembly 12, etc. In this connection and depending upon similar design factors, it should be noted that more than one elongated track 16 may be used to support a single support assembly 14. Specifically, one support assembly 14 could be inserted within channels 30 of parallel elongated track 16 to distribute loading across multiple elongated tracks 16.

Any number of support assemblies 14 may be installed along elongated track 16 (which can conceivably be of a very long length), limited only by the strength of elongated track 16 and by how securely surface mounted assembly 12 is mounted to a surface. Additionally, though the surface mounted assemblies described above and illustrated in the accompanying drawings are each shown vertically mounted, any mounting orientation (e.g., horizontally, sideways, etc.) is possible on any surface (e.g., wall, floor, ceiling, etc.).

What is claimed is:

1. A mounting system comprising:
   a bracket assembly having at least one generally hook-shaped leg extending therefrom;
   an elongated member having at least one channel formed therein, the at least one channel having a cross-sectional shape adapted to receive the at least one hook-shaped leg;
   at least one cantilevered support member secured at one end to the bracket assembly and extending away from the bracket assembly, the cantilevered support member in use exerting a rotational force on the bracket assembly causing the at least one hook-shaped leg to rotate and lock in place within the at least one channel.

2. The mounting system as claimed in claim 1, wherein the bracket assembly has two generally hook-shaped legs extending therefrom, and wherein the elongated member has two channels formed therein each adapted to receive one of the two hook-shaped legs of the bracket assembly.

3. The mounting system as claimed in claim 1, wherein the at least one hook-shaped leg has a J-shaped cross-section and wherein the cross-sectional shape of the at least one channel is J-shaped in a manner adapted to receive the at least one hook-shaped leg.

4. The mounting system as claimed in claim 1, wherein the at least one hook-shaped leg has a T-shaped cross-section and wherein the cross-sectional shape of the at least one channel is T-shaped in a manner adapted to receive the at least one hook-shaped leg.

5. The mounting system as claimed in claim 1, wherein the at least one hook-shaped leg may be unlocked from position within the at least one channel by raising the at least one cantilevered support member, thereby permitting movement of the bracket assembly and cantilevered support member along the elongated support member.

6. The mounting system as claimed in claim 5, wherein the bracket assembly has
 a base and
 at least one clip adjustably secured thereto, the at least one hook-shaped leg extending from the clip, the at least one cantilevered support member being secured at one end to the base of the bracket assembly.

7. The mounting system as claimed in claim 6, wherein the at least one clip is adjustable from a first position where the bracket assembly may be moved along the length of the elongated member to a second position where the bracket assembly is locked in place in a position on the elongated member, and back to the first position.

8. The mounting system as claimed in claim 1, wherein the at least one cantilevered support member has a tilt adjustment member which is adjustable to tilt the at least one cantilevered support member through a range of positions with respect to the bracket assembly.

9. The mounting system as claimed in claim 1, wherein the tilt adjustment member is a threaded fastener which passes through a threaded hole formed in the at least one cantilevered support member and abuts against the bracket assembly, tilt adjustment of the at least one cantilevered support member resulting from turning of the threaded fastener to vary a distance between the at least one cantilevered support and the bracket assembly.

10. The mounting system as claimed in claim 1, wherein the bracket assembly and the at least one cantilevered support member may be moved to and locked in place at any point along the elongated member.

11. The mounting system as claimed in claim 1, further comprising at least one shroud secured alongside the elongated member, the shroud having a series of walls defining an elongated cavity running alongside the elongated member.

12. The mounting system as claimed in claim 11, wherein at least one of the series of walls is flexible and may be moved to permit access to the elongated cavity inside the shroud.

13. The mounting system as claimed in claim 11, wherein said shroud has
 a first edge held in place proximate a front surface of the elongated support member; and
 a second edge held in place proximate a rear surface of the elongated support member,
 and wherein the elongated cavity runs beside and behind a length of the elongated member.

14. The mounting system as claimed in claim 11, wherein a first shroud runs alongside one side of the elongated member and a second shroud runs alongside an opposite side of the elongated member.

15. The mounting system as claimed in claim 1, further comprising a vibration absorbing element attached to the at least one cantilevered support member.

16. The mounting system as claimed in claim 1, further comprising a housing enclosing the bracket assembly, the housing having at least one hole formed therein through which the at least one cantilevered support member passes.

17. The mounting system as claimed in claim 16, further comprising a vibration absorbing element attached to a surface of the housing.

18. The mounting system as claimed in claim 17, further comprising a vibration absorbing element attached to the at least one cantilevered support member.

19. The mounting system as claimed in claim 1, further comprising a planar support element positioned on top of the at least one cantilevered support member.

20. The mounting system as claimed in claim 15, further comprising a vibration absorbing element attached to the at least one cantilevered support member, the planar support element resting on top of the vibration absorbing element.

21. The mounting system as claimed in claim 20, wherein the planar support element is secured to the at least one cantilevered support member via the vibration absorbing element.

22. The mounting system as claimed in claim 1, wherein the at least one cantilevered support member is a tube, the tube having at least one hole formed in a side thereof, the surface mounting system further comprising
 a light emitting element received within the at least one cantilevered support member, the at least one hole permitting light from the light emitting element to exit the at least one cantilevered support member.

23. The mounting system as claimed in claim 1, further including a light emitting element located behind the elongated member for illuminating an area behind the elongated member.

24. The mounting system as claimed in claim 1, further comprising a light emitting element located proximate the bracket assembly for illuminating an area in front of the elongated member.

25. The mounting system as claimed in claim 19, further comprising a light emitting element located proximate an edge of the planar support element for illuminating at least part of the planar support element.

26. The mounting system as claimed in claim 24, further comprising a housing enclosing the bracket assembly, the housing having at least one hole formed therein to permit light from the light emitting element to escape from within the housing.

27. The mounting system as claimed in claim 1, further comprising a light emitting element for illuminating at least a part of the surface mounting system.

28. The mounting system as claimed in claim 27, wherein the light emitting element is in electrical communication with at least one conductor located within the at least one channel, the at least one conductor being in electrical communication with a power source.

29. The mounting system as claimed in claim 1, further comprising an end cap releasably coupled to one end of the elongated member, the end cap being attached to a surface onto which the surface mounting system is secured.

30. The mounting system as claimed in claim 29, wherein the elongated member rests flush against a surface when the end cap is coupled thereto and is attached to the surface.

31. The mounting system as claimed in claim 29, wherein the end cap has a protruding rear face raising the end cap and elongated member coupled thereto off a surface to which the end cap is attached.

32. The mounting system as claimed in claim 29, wherein the end cap has a wire management hole formed therethrough for passage of wires to a location behind the end cap.

33. The mounting system as claimed in claim 1, further comprising at least one intermediate support attached to a rear surface of the elongated member and to a surface onto which the surface mounting system is secured.

34. The mounting system as claimed in claim 1, further comprising:
   a secondary support releasably secured to the elongated member in a position above the at least one cantilevered support member; and
   a load carrying element connecting the secondary support to the at least one cantilevered support member.

35. The mounting system as claimed in claim 34, where the load carrying element is a cable.

36. A method for securing a cantilevered support member supporting an object at a set height, comprising the steps of:
   providing an elongated member, the elongated member having at least one channel running a vertical length along the elongated member;
   providing a bracket assembly having at least one generally hook-shaped leg received within the at least one channel, the bracket assembly being attached to the cantilevered support member;
   lifting the cantilevered support member to release the at least one hook-shaped leg from a position in the at least one channel;
   moving the bracket assembly and cantilevered support member along the vertical length of the elongated member; and
   lowering the cantilevered support member to lock the at least one hook-shaped leg in the different position in the at least one channel.

37. The method as claimed in claim 36, further comprising the steps of:
   providing at least one clip attached to the bracket assembly, the at least one clip being adjustable to and from a locked position in which the bracket assembly and cantilevered support member may not be moved and an unlocked position in which the bracket assembly and cantilevered support member may be moved;
   prior to the step of lifting the cantilevered support member, adjusting the at least one clip from the locked position to the unlocked position;
   after the step of lowering the cantilevered support, adjusting the at least one clip from the unlocked position to the locked position.

38. The method as claimed in claim 36, further comprising the steps of:
   providing a tilt adjustment member mechanically coupled to the cantilevered support member the tilt adjustment member being adjustable to releasably secure the cantilevered support member in at least two different tilt positions;
   adjusting the tilt adjustment member from a first position to a second position to change the tilt position of the cantilevered support member.

39. The method as claimed in claim 38, wherein the tilt adjustment member is a threaded fastener which passes through a threaded hole formed in the cantilevered support member and abuts against the bracket assembly, tilt adjustment of the cantilevered support member resulting from turning of the threaded fastener to vary a distance between the cantilevered support member and the bracket assembly.

40. The method as claimed in claim 36, wherein the bracket assembly and the cantilevered support member may be moved to and locked in place at any point along the elongated member.

41. The method as claimed in claim 36, further comprising the steps of:
   providing a shroud secured to a surface of the elongated member, the shroud having a series of walls defining a cavity running along a length of the elongated member, the cavity adapted to receive a part of the object supported on the cantilevered support member;
   after the step of lowering the cantilevered support member, inserting a part of the object within the cavity.

42. The method as claimed in claim 41, wherein at least one of the series of walls is movable between an open position permitting access to the cavity and a closed position.

43. The method as claimed in claim 41, wherein more than one shroud is secured to a surface of the elongated member, each shroud having a series of walls defining a cavity running along a length of the elongated member, the cavity adapted to receive a part of the object supported on the cantilevered support member.

44. A surface mounting system comprising:
   an elongated member having at least one channel formed therein;
   a bracket assembly having at least one extension adapted to fit within the at least one channel in the elongated member; and
   a cantilevered support member attached to the bracket assembly;
   the at least one extension of the bracket assembly binding within the at least one channel when total downward forces on the bracket assembly exceed total upward forces on the bracket assembly, and the at least one extension of the bracket assembly slidable within the at least one channel when total upward forces of the bracket assembly exceed total downward forces on the bracket assembly.

45. The mounting system as claimed in claim 44, wherein the at least one extension of the bracket assembly and the at least one channel of the elongated member have bent cross-sectional shapes.

46. The mounting system as claimed in claim 44, wherein the at least one extension is an adjustable bracket locking element connecting the bracket assembly to the elongated element, the bracket locking element being adjustable between a secured position in which the bracket assembly may not be moved within the at least one channel to an unsecured position in which the bracket assembly may be moved within the at least one channel.

47. The mounting system as claimed in claim 46, wherein the bracket assembly further includes a leg which extends into the at least one channel beside the at least one extension, the leg preventing rotation of the bracket assembly in a downward direction and the at least one extension preventing rotation of the bracket assembly in an upward direction when the at least one extension is in its secured position.

48. The mounting system as claimed in claim 44, wherein the at cantilevered support member has a tilt adjustment member which is adjustable to tilt the cantilevered support member through a range of positions with respect to the bracket assembly.

49. The mounting system as claimed in claim 44, wherein the bracket assembly and the cantilevered support member are movable and lockable in place at any point along the at least one channel in the elongated member.

50. The mounting system as claimed in claim 44, further comprising at least one shroud secured alongside the elongated member, the shroud having a series of walls defining an elongated cavity running alongside the elongated member.

51. The mounting system as claimed in claim 50, wherein at least one of the series of walls is flexible and may be moved to permit access to the elongated cavity inside the shroud.

* * * * *